United States Patent
Briggs et al.

(10) Patent No.: US 9,168,654 B2
(45) Date of Patent: Oct. 27, 2015

(54) COORDINATE MEASURING MACHINES WITH DUAL LAYER ARM

(75) Inventors: Clark H. Briggs, DeLand, FL (US); Brent Bailey, Winter Springs, FL (US); Kenneth Campbell, Orlando, FL (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 499 days.

(21) Appl. No.: 13/486,673

(22) Filed: Jun. 1, 2012

(65) Prior Publication Data

US 2013/0205606 A1 Aug. 15, 2013

Related U.S. Application Data

(60) Continuation-in-part of application No. 29/412,903, filed on Feb. 9, 2012, now Pat. No. Des. 676,341, which is a division of application No. 29/379,170, filed on Nov. 16, 2010, now Pat. No. Des. 662,427.

(51) Int. Cl.
| | |
|---|---|
| *G01B 5/008* | (2006.01) |
| *G01B 1/00* | (2006.01) |
| *B25J 9/00* | (2006.01) |
| *G01B 11/00* | (2006.01) |
| *B29D 23/00* | (2006.01) |

(52) U.S. Cl.
CPC .............. *B25J 9/0012* (2013.01); *G01B 1/00* (2013.01); *G01B 5/008* (2013.01); *G01B 11/005* (2013.01); *B29D 23/001* (2013.01)

(58) Field of Classification Search
CPC .......... G01B 5/004; G01B 5/008; G01B 1/00; G01B 11/00
USPC ............................................................ 33/503
See application file for complete search history.

(56) References Cited

U.S. PATENT DOCUMENTS

| | | |
|---|---|---|
| 1,538,758 A | 5/1925 | Taylor |
| 1,918,813 A | 7/1933 | Kinzy |

(Continued)

FOREIGN PATENT DOCUMENTS

| | | |
|---|---|---|
| AU | 2005200937 A1 | 9/2006 |
| CN | 2236119 Y | 9/1996 |

(Continued)

OTHER PUBLICATIONS

Written Opinion of the International Searching Authority for International Application No. PCT/US2011/021264 mailed May 31, 2011.

(Continued)

*Primary Examiner* — Richard A Smith
(74) *Attorney, Agent, or Firm* — Cantor Colburn LLP

(57) ABSTRACT

A portable articulated arm coordinate measuring machine (AACMM) is provided including a manually positionable articulated arm having opposed first and second ends. The arm includes multiple connected arm segments. Each arm segment has a longitudinal axis. Each arm segment includes a generally tubular core, an outer sleeve surrounding at least a portion of a length of the core, and at least one position transducer for producing a position signal. The outer sleeve is a cylindrical tube having a first portion at a first end and a second portion that extends from the first portion to an opposite end. The first portion is coupled to an end of the core. The first portion is shorter than the second portion and the second portion is configured to move relative to the core.

26 Claims, 13 Drawing Sheets

(56) References Cited

U.S. PATENT DOCUMENTS

| | | | |
|---|---|---|---|
| 2,316,573 A | 4/1943 | Egy | |
| 2,333,243 A | 11/1943 | Glab | |
| 2,702,683 A | 2/1955 | Green et al. | |
| 2,748,926 A | 6/1956 | Leahy | |
| 2,924,495 A | 2/1960 | Haines | |
| 2,966,257 A | 12/1960 | Littlejohn | |
| 2,983,367 A | 5/1961 | Paramater et al. | |
| 3,066,790 A | 12/1962 | Armbruster | |
| 3,447,852 A | 6/1969 | Barlow | |
| 3,458,167 A | 7/1969 | Cooley, Jr. | |
| 3,830,567 A | 8/1974 | Riegl | |
| 3,899,145 A | 8/1975 | Stephenson | |
| 3,945,729 A | 3/1976 | Rosen | |
| 4,178,515 A | 12/1979 | Tarasevich | |
| 4,340,008 A | 7/1982 | Mendelson | |
| 4,379,461 A | 4/1983 | Nilsson et al. | |
| 4,424,899 A | 1/1984 | Rosenberg | |
| 4,430,796 A | 2/1984 | Nakagawa | |
| 4,457,625 A | 7/1984 | Greenleaf et al. | |
| 4,506,448 A | 3/1985 | Topping et al. | |
| 4,537,233 A | 8/1985 | Vroonland et al. | |
| 4,561,776 A | 12/1985 | Pryor | |
| 4,606,696 A | 8/1986 | Slocum | |
| 4,659,280 A | 4/1987 | Akeel | |
| 4,663,852 A | 5/1987 | Guarini | |
| 4,664,588 A | 5/1987 | Newell et al. | |
| 4,667,231 A | 5/1987 | Pryor | |
| 4,676,002 A | 6/1987 | Slocum | |
| 4,714,339 A | 12/1987 | Lau et al. | |
| 4,733,961 A | 3/1988 | Mooney | |
| 4,736,218 A | 4/1988 | Kutman | |
| 4,767,257 A | 8/1988 | Kato | |
| 4,790,651 A | 12/1988 | Brown et al. | |
| 4,816,822 A | 3/1989 | Vache et al. | |
| 4,870,274 A | 9/1989 | Hebert et al. | |
| 4,882,806 A | 11/1989 | Davis | |
| 4,891,509 A | 1/1990 | Jones et al. | |
| 4,954,952 A | 9/1990 | Ubhayakar et al. | |
| 4,984,881 A | 1/1991 | Osada et al. | |
| 4,996,909 A | 3/1991 | Vache et al. | |
| 4,999,491 A | 3/1991 | Semler et al. | |
| 5,021,641 A | 6/1991 | Swartz et al. | |
| 5,025,966 A | 6/1991 | Potter | |
| 5,027,951 A | 7/1991 | Johnson | |
| 5,068,971 A | 12/1991 | Simon | |
| 5,069,524 A | 12/1991 | Watanabe et al. | |
| 5,155,684 A | 10/1992 | Burke et al. | |
| 5,168,532 A | 12/1992 | Seppi et al. | |
| 5,189,797 A | 3/1993 | Granger | |
| 5,205,111 A | 4/1993 | Johnson | |
| 5,211,476 A | 5/1993 | Coudroy | |
| 5,212,738 A | 5/1993 | Chande et al. | |
| 5,213,240 A | 5/1993 | Dietz et al. | |
| 5,216,479 A | 6/1993 | Dotan et al. | |
| 5,218,427 A | 6/1993 | Koch | |
| 5,219,423 A | 6/1993 | Kamaya | |
| 5,239,855 A | 8/1993 | Schleifer et al. | |
| 5,289,264 A | 2/1994 | Steinbichler | |
| 5,289,265 A | 2/1994 | Inoue et al. | |
| 5,289,855 A | 3/1994 | Baker et al. | |
| 5,313,261 A | 5/1994 | Leatham et al. | |
| 5,319,445 A | 6/1994 | Fitts | |
| 5,329,347 A | 7/1994 | Wallace et al. | |
| 5,329,467 A | 7/1994 | Nagamune et al. | |
| 5,332,315 A | 7/1994 | Baker et al. | |
| 5,337,149 A | 8/1994 | Kozah et al. | |
| 5,371,347 A | 12/1994 | Plesko | |
| 5,372,250 A | 12/1994 | Johnson | |
| 5,373,346 A | 12/1994 | Hocker | |
| 5,402,365 A | 3/1995 | Kozikaro et al. | |
| 5,402,582 A | 4/1995 | Raab | |
| 5,412,880 A | 5/1995 | Raab | |
| 5,416,505 A | 5/1995 | Eguchi et al. | |
| 5,430,384 A | 7/1995 | Hocker | |
| 5,446,846 A | 8/1995 | Lennartsson | |
| 5,455,670 A | 10/1995 | Payne et al. | |
| 5,455,993 A | 10/1995 | Link et al. | |
| 5,510,977 A | 4/1996 | Raab | |
| 5,517,297 A | 5/1996 | Stenton | |
| 5,528,354 A | 6/1996 | Uwira | |
| 5,528,505 A | 6/1996 | Granger et al. | |
| 5,535,524 A | 7/1996 | Carrier et al. | |
| 5,577,130 A | 11/1996 | Wu | |
| 5,611,147 A | 3/1997 | Raab | |
| 5,615,489 A | 4/1997 | Breyer et al. | |
| 5,623,416 A | 4/1997 | Hocker, III | |
| 5,629,756 A | 5/1997 | Kitajima | |
| 5,668,631 A | 9/1997 | Norita et al. | |
| 5,675,326 A | 10/1997 | Juds et al. | |
| 5,677,760 A | 10/1997 | Mikami et al. | |
| 5,682,508 A | 10/1997 | Hocker, III | |
| 5,716,036 A | 2/1998 | Isobe et al. | |
| 5,724,264 A | 3/1998 | Rosenberg et al. | |
| 5,734,417 A | 3/1998 | Yamamoto et al. | |
| 5,745,225 A | 4/1998 | Watanabe et al. | |
| 5,752,112 A | 5/1998 | Paddock et al. | |
| 5,754,449 A | 5/1998 | Hoshal et al. | |
| 5,768,792 A | 6/1998 | Raab | |
| 5,793,993 A | 8/1998 | Broedner et al. | |
| 5,804,805 A | 9/1998 | Koenck et al. | |
| 5,825,666 A | 10/1998 | Freifeld | |
| 5,829,148 A | 11/1998 | Eaton | |
| 5,831,719 A | 11/1998 | Berg et al. | |
| 5,832,416 A | 11/1998 | Anderson | |
| 5,844,591 A | 12/1998 | Takamatsu et al. | |
| 5,856,874 A | 1/1999 | Tachibana et al. | |
| 5,887,122 A | 3/1999 | Terawaki et al. | |
| 5,894,123 A | 4/1999 | Ohtomo et al. | |
| 5,898,490 A | 4/1999 | Ohtomo et al. | |
| 5,909,939 A | 6/1999 | Fugmann | |
| 5,926,782 A | 7/1999 | Raab | |
| 5,933,267 A | 8/1999 | Ishizuka | |
| 5,936,721 A | 8/1999 | Ohtomo et al. | |
| 5,940,170 A | 8/1999 | Berg et al. | |
| 5,940,181 A | 8/1999 | Tsubono et al. | |
| 5,949,530 A | 9/1999 | Wetteborn | |
| 5,956,661 A | 9/1999 | Lefebvre et al. | |
| 5,956,857 A | 9/1999 | Raab | |
| 5,969,321 A | 10/1999 | Danielson et al. | |
| 5,973,788 A | 10/1999 | Pettersen et al. | |
| 5,978,748 A | 11/1999 | Raab | |
| 5,983,936 A | 11/1999 | Schwieterman et al. | |
| 5,988,862 A | 11/1999 | Kacyra et al. | |
| 5,991,011 A | 11/1999 | Damm | |
| 5,997,779 A | 12/1999 | Potter | |
| 6,040,898 A | 3/2000 | Mrosik et al. | |
| D423,534 S | 4/2000 | Raab et al. | |
| 6,050,615 A | 4/2000 | Weinhold | |
| 6,057,915 A | 5/2000 | Squire et al. | |
| 6,060,889 A | 5/2000 | Hocker | |
| 6,067,116 A | 5/2000 | Yamano et al. | |
| 6,069,700 A | 5/2000 | Rudnick et al. | |
| 6,077,306 A | 6/2000 | Metzger et al. | |
| 6,112,423 A | 9/2000 | Sheehan | |
| 6,115,511 A | 9/2000 | Sakai et al. | |
| 6,125,337 A | 9/2000 | Rosenberg et al. | |
| 6,131,299 A | 10/2000 | Raab et al. | |
| 6,134,507 A | 10/2000 | Markey, Jr. et al. | |
| 6,138,915 A | 10/2000 | Danielson et al. | |
| 6,149,112 A | 11/2000 | Thieltges | |
| 6,151,789 A | 11/2000 | Raab et al. | |
| 6,163,294 A | 12/2000 | Talbot | |
| 6,166,504 A | 12/2000 | Iida et al. | |
| 6,166,809 A | 12/2000 | Pettersen et al. | |
| 6,166,811 A | 12/2000 | Long et al. | |
| 6,204,651 B1 | 3/2001 | Marcus et al. | |
| 6,204,961 B1 | 3/2001 | Anderson et al. | |
| 6,219,928 B1 | 4/2001 | Raab et al. | |
| D441,632 S | 5/2001 | Raab et al. | |
| 6,240,651 B1 | 6/2001 | Schroeder et al. | |
| 6,253,458 B1 | 7/2001 | Raab et al. | |
| 6,282,195 B1 | 8/2001 | Miller et al. | |
| 6,285,390 B1 | 9/2001 | Blake | |
| 6,298,569 B1 | 10/2001 | Raab et al. | |

(56) References Cited

U.S. PATENT DOCUMENTS

| | | |
|---|---|---|
| 6,339,410 B1 | 1/2002 | Milner et al. |
| 6,349,249 B1 | 2/2002 | Cunningham |
| 6,366,831 B1 | 4/2002 | Raab |
| 6,408,252 B1 | 6/2002 | De Smet |
| 6,418,774 B1 | 7/2002 | Brogaardh et al. |
| 6,438,507 B1 | 8/2002 | Imai |
| 6,438,856 B1 | 8/2002 | Kaczynski |
| 6,442,419 B1 | 8/2002 | Chu et al. |
| 6,445,446 B1 | 9/2002 | Kumagai et al. |
| 6,460,004 B2 | 10/2002 | Greer et al. |
| 6,470,584 B1 | 10/2002 | Stoodley |
| 6,477,784 B2 | 11/2002 | Schroeder et al. |
| 6,480,270 B1 | 11/2002 | Studnicka et al. |
| 6,483,106 B1 | 11/2002 | Ohtomo et al. |
| 6,497,394 B1 | 12/2002 | Dunchock |
| 6,504,602 B1 | 1/2003 | Hinderling |
| 6,512,575 B1 | 1/2003 | Marchi |
| 6,519,860 B1 | 2/2003 | Bieg et al. |
| D472,824 S | 4/2003 | Raab et al. |
| 6,542,249 B1 | 4/2003 | Kofman et al. |
| 6,547,397 B1 | 4/2003 | Kaufman et al. |
| 6,598,306 B2 | 7/2003 | Eaton |
| 6,611,346 B2 | 8/2003 | Granger |
| 6,611,617 B1 | 8/2003 | Crampton |
| D479,544 S | 9/2003 | Raab et al. |
| 6,612,044 B2 | 9/2003 | Raab et al. |
| 6,621,065 B1 | 9/2003 | Fukumoto et al. |
| 6,633,051 B1 | 10/2003 | Holloway et al. |
| 6,649,208 B2 | 11/2003 | Rodgers |
| 6,650,402 B2 | 11/2003 | Sullivan et al. |
| 6,668,466 B1 | 12/2003 | Bieg et al. |
| 6,675,122 B1 | 1/2004 | Markendorf et al. |
| 6,681,495 B2 | 1/2004 | Masayuki et al. |
| 6,710,859 B2 | 3/2004 | Shirai et al. |
| D490,831 S | 6/2004 | Raab et al. |
| D491,210 S | 6/2004 | Raab et al. |
| 6,750,873 B1 | 6/2004 | Bernardini et al. |
| 6,753,876 B2 | 6/2004 | Brooksby et al. |
| 6,759,649 B2 | 7/2004 | Hipp |
| 6,759,979 B2 | 7/2004 | Vashisth et al. |
| 6,764,185 B1 | 7/2004 | Beardsley et al. |
| 6,789,327 B2 | 9/2004 | Roth et al. |
| 6,820,346 B2 | 11/2004 | Raab et al. |
| 6,822,749 B1 | 11/2004 | Christoph |
| 6,825,923 B2 | 11/2004 | Hamar et al. |
| 6,826,664 B2 | 11/2004 | Hocker, III et al. |
| 6,847,436 B2 | 1/2005 | Bridges |
| 6,856,381 B2 | 2/2005 | Christoph |
| 6,858,836 B1 | 2/2005 | Hartrumpf |
| 6,859,269 B2 | 2/2005 | Ohtomo et al. |
| 6,862,097 B2 | 3/2005 | Yanagisawa et al. |
| 6,868,359 B2 | 3/2005 | Raab |
| 6,879,933 B2 | 4/2005 | Steffey et al. |
| 6,889,903 B1 | 5/2005 | Koenck |
| 6,892,465 B2 | 5/2005 | Raab et al. |
| 6,894,767 B2 | 5/2005 | Ishinabe et al. |
| 6,895,347 B2 | 5/2005 | Dorny et al. |
| 6,901,673 B1 | 6/2005 | Cobb et al. |
| 6,904,691 B2 | 6/2005 | Raab et al. |
| 6,914,678 B1 | 7/2005 | Ulrichsen et al. |
| 6,917,415 B2 | 7/2005 | Gogolla et al. |
| 6,920,697 B2 | 7/2005 | Raab et al. |
| 6,922,234 B2 | 7/2005 | Hoffman et al. |
| 6,925,722 B2 | 8/2005 | Raab et al. |
| 6,931,745 B2 | 8/2005 | Granger |
| 6,935,748 B2 | 8/2005 | Kaufman et al. |
| 6,948,255 B2 | 9/2005 | Russell |
| 6,957,496 B2 | 10/2005 | Raab et al. |
| 6,965,843 B2 | 11/2005 | Raab et al. |
| 6,973,734 B2 | 12/2005 | Raab et al. |
| 6,988,322 B2 | 1/2006 | Raab et al. |
| 6,989,890 B2 | 1/2006 | Riegl et al. |
| 7,003,892 B2 | 2/2006 | Eaton et al. |
| 7,006,084 B1 | 2/2006 | Buss et al. |
| 7,024,032 B2 | 4/2006 | Kidd et al. |
| 7,029,126 B2 | 4/2006 | Tang |
| 7,032,321 B2 | 4/2006 | Raab et al. |
| 7,040,136 B2 | 5/2006 | Forss et al. |
| 7,051,447 B2 | 5/2006 | Kikuchi et al. |
| 7,069,124 B1 | 6/2006 | Whittaker et al. |
| 7,076,420 B1 | 7/2006 | Snyder et al. |
| 7,106,421 B2 | 9/2006 | Matsuura et al. |
| 7,117,107 B2 | 10/2006 | Dorny et al. |
| 7,120,092 B2 | 10/2006 | del Prado Pavon et al. |
| 7,127,822 B2 | 10/2006 | Kumagai et al. |
| 7,136,153 B2 | 11/2006 | Mori et al. |
| 7,140,213 B2 | 11/2006 | Feucht et al. |
| 7,142,289 B2 | 11/2006 | Ando et al. |
| 7,145,926 B2 | 12/2006 | Vitruk et al. |
| 7,152,456 B2 | 12/2006 | Eaton |
| 7,174,651 B2 | 2/2007 | Raab et al. |
| 7,180,072 B2 | 2/2007 | Persi et al. |
| 7,184,047 B1 | 2/2007 | Crampton |
| 7,190,465 B2 | 3/2007 | Froehlich et al. |
| 7,191,541 B1 | 3/2007 | Weekers et al. |
| 7,193,690 B2 | 3/2007 | Ossig et al. |
| 7,196,509 B2 | 3/2007 | Teng |
| 7,199,872 B2 | 4/2007 | Van Cranenbroeck |
| 7,200,246 B2 | 4/2007 | Cofer et al. |
| 7,202,941 B2 | 4/2007 | Munro |
| 7,230,689 B2 | 6/2007 | Lau |
| 7,242,590 B1 | 7/2007 | Yeap et al. |
| 7,246,030 B2 | 7/2007 | Raab et al. |
| 7,249,421 B2 | 7/2007 | MacManus et al. |
| 7,256,899 B1 | 8/2007 | Faul et al. |
| 7,269,910 B2 | 9/2007 | Raab et al. |
| 7,285,793 B2 | 10/2007 | Husted |
| 7,296,364 B2 | 11/2007 | Seitz et al. |
| 7,296,955 B2 | 11/2007 | Dreier |
| 7,296,979 B2 | 11/2007 | Raab et al. |
| 7,306,339 B2 | 12/2007 | Kaufman et al. |
| 7,307,701 B2 | 12/2007 | Hoffman, II |
| 7,312,862 B2 | 12/2007 | Zumbrunn et al. |
| 7,313,264 B2 | 12/2007 | Crampton |
| 7,319,512 B2 | 1/2008 | Ohtomo et al. |
| 7,330,242 B2 | 2/2008 | Reichert et al. |
| 7,337,344 B2 | 2/2008 | Barman et al. |
| 7,342,650 B2 | 3/2008 | Kern et al. |
| 7,348,822 B2 | 3/2008 | Baer |
| 7,352,446 B2 | 4/2008 | Bridges et al. |
| 7,372,558 B2 | 5/2008 | Kaufman et al. |
| 7,372,581 B2 | 5/2008 | Raab et al. |
| 7,383,638 B2 | 6/2008 | Granger |
| 7,388,654 B2 | 6/2008 | Raab et al. |
| 7,389,870 B2 | 6/2008 | Slappay |
| 7,395,606 B2 | 7/2008 | Crampton |
| 7,400,384 B1 | 7/2008 | Evans et al. |
| 7,403,268 B2 | 7/2008 | England et al. |
| 7,403,269 B2 | 7/2008 | Yamashita et al. |
| 7,430,068 B2 | 9/2008 | Becker et al. |
| 7,430,070 B2 | 9/2008 | Soreide et al. |
| 7,441,341 B2 | 10/2008 | Eaton |
| 7,443,555 B2 | 10/2008 | Blug et al. |
| 7,447,931 B1 | 11/2008 | Rischar et al. |
| 7,449,876 B2 | 11/2008 | Pleasant et al. |
| 7,454,265 B2 | 11/2008 | Marsh |
| 7,463,368 B2 | 12/2008 | Morden et al. |
| 7,477,359 B2 | 1/2009 | England et al. |
| 7,477,360 B2 | 1/2009 | England et al. |
| 7,480,037 B2 | 1/2009 | Palmateer et al. |
| 7,508,496 B2 | 3/2009 | Mettenleiter et al. |
| 7,508,971 B2 | 3/2009 | Vaccaro et al. |
| 7,515,256 B2 | 4/2009 | Ohtomo et al. |
| 7,525,276 B2 | 4/2009 | Eaton |
| 7,527,205 B2 | 5/2009 | Zhu et al. |
| 7,528,768 B2 | 5/2009 | Wakayama et al. |
| 7,541,830 B2 | 6/2009 | Fahrbach et al. |
| 7,545,517 B2 | 6/2009 | Rueb et al. |
| 7,546,689 B2 | 6/2009 | Ferrari et al. |
| 7,551,771 B2 | 6/2009 | England, III |
| 7,552,644 B2 | 6/2009 | Haase et al. |
| 7,557,824 B2 | 7/2009 | Holliman |
| 7,561,598 B2 | 7/2009 | Stratton et al. |
| 7,564,250 B2 | 7/2009 | Hocker |

(56) References Cited

U.S. PATENT DOCUMENTS

| | | |
|---|---|---|
| 7,568,293 B2 | 8/2009 | Ferrari |
| 7,578,069 B2 | 8/2009 | Eaton |
| D599,226 S | 9/2009 | Gerent et al. |
| 7,589,595 B2 | 9/2009 | Cutler |
| 7,589,825 B2 | 9/2009 | Orchard et al. |
| 7,591,077 B2 | 9/2009 | Pettersson |
| 7,591,078 B2 | 9/2009 | Crampton |
| 7,599,106 B2 | 10/2009 | Matsumoto et al. |
| 7,600,061 B2 | 10/2009 | Honda |
| 7,602,873 B2 | 10/2009 | Eidson |
| 7,604,207 B2 | 10/2009 | Hasloecher et al. |
| 7,610,175 B2 | 10/2009 | Eidson |
| 7,614,157 B2 | 11/2009 | Granger |
| 7,624,510 B2 | 12/2009 | Ferrari |
| 7,625,335 B2 | 12/2009 | Deichmann et al. |
| 7,626,690 B2 | 12/2009 | Kumagai et al. |
| D607,350 S | 1/2010 | Cooduvalli et al. |
| 7,656,751 B2 | 2/2010 | Rischar et al. |
| 7,659,995 B2 | 2/2010 | Knighton et al. |
| 7,693,325 B2 | 4/2010 | Pulla et al. |
| 7,697,748 B2 | 4/2010 | Dimsdale et al. |
| 7,701,592 B2 | 4/2010 | Saint Clair et al. |
| 7,712,224 B2 | 5/2010 | Hicks |
| 7,721,396 B2 | 5/2010 | Fleischman |
| 7,728,833 B2 | 6/2010 | Verma et al. |
| 7,728,963 B2 | 6/2010 | Kirschner |
| 7,733,544 B2 | 6/2010 | Becker et al. |
| 7,735,234 B2 | 6/2010 | Briggs et al. |
| 7,743,524 B2 | 6/2010 | Eaton et al. |
| 7,752,003 B2 | 7/2010 | MacManus |
| 7,756,615 B2 | 7/2010 | Barfoot et al. |
| 7,765,707 B2 | 8/2010 | Tomelleri |
| 7,769,559 B2 | 8/2010 | Reichert |
| 7,774,949 B2 | 8/2010 | Ferrari |
| 7,777,761 B2 | 8/2010 | England et al. |
| 7,779,548 B2 | 8/2010 | Ferrari |
| 7,779,553 B2 | 8/2010 | Jordil et al. |
| 7,784,194 B2 | 8/2010 | Raab et al. |
| 7,787,670 B2 | 8/2010 | Urushiya |
| 7,793,425 B2 | 9/2010 | Bailey |
| 7,798,453 B2 | 9/2010 | Maningo et al. |
| 7,800,758 B1 | 9/2010 | Bridges et al. |
| 7,804,602 B2 | 9/2010 | Raab |
| 7,805,851 B2 | 10/2010 | Pettersson |
| 7,805,854 B2 | 10/2010 | Eaton |
| 7,809,518 B2 | 10/2010 | Zhu et al. |
| 7,834,985 B2 | 11/2010 | Morcom |
| 7,847,922 B2 | 12/2010 | Gittinger et al. |
| RE42,055 E | 1/2011 | Raab et al. |
| 7,869,005 B2 | 1/2011 | Ossig et al. |
| RE42,082 E | 2/2011 | Raab et al. |
| 7,881,896 B2 | 2/2011 | Atwell et al. |
| 7,889,324 B2 | 2/2011 | Yamamoto |
| 7,891,248 B2 | 2/2011 | Hough et al. |
| 7,900,714 B2 | 3/2011 | Milbourne et al. |
| 7,903,245 B2 | 3/2011 | Miousset et al. |
| 7,903,261 B2 | 3/2011 | Saint Clair et al. |
| 7,908,757 B2 | 3/2011 | Ferrari |
| 7,933,055 B2 | 4/2011 | Jensen et al. |
| 7,935,928 B2 | 5/2011 | Serger et al. |
| 7,965,747 B2 | 6/2011 | Kumano |
| 7,982,866 B2 | 7/2011 | Vogel |
| D643,319 S | 8/2011 | Ferrari et al. |
| 7,990,397 B2 | 8/2011 | Bukowski et al. |
| 7,994,465 B1 | 8/2011 | Bamji et al. |
| 7,995,834 B1 | 8/2011 | Knighton et al. |
| 8,001,697 B2 | 8/2011 | Danielson et al. |
| 8,020,657 B2 | 9/2011 | Allard et al. |
| 8,022,812 B2 | 9/2011 | Beniyama et al. |
| 8,028,432 B2 | 10/2011 | Bailey et al. |
| 8,036,775 B2 | 10/2011 | Matsumoto et al. |
| 8,045,762 B2 | 10/2011 | Otani et al. |
| 8,051,710 B2 | 11/2011 | Van Dam et al. |
| 8,052,857 B2 | 11/2011 | Townsend |
| 8,064,046 B2 | 11/2011 | Ossig et al. |
| 8,082,673 B2 | 12/2011 | Desforges et al. |
| 8,099,877 B2 | 1/2012 | Champ |
| 8,117,668 B2 | 2/2012 | Crampton et al. |
| 8,123,350 B2 | 2/2012 | Cannell et al. |
| 8,152,071 B2 | 4/2012 | Doherty et al. |
| D659,035 S | 5/2012 | Ferrari et al. |
| 8,171,650 B2 | 5/2012 | York et al. |
| 8,179,936 B2 | 5/2012 | Bueche et al. |
| D662,427 S | 6/2012 | Bailey et al. |
| 8,218,131 B2 | 7/2012 | Otani et al. |
| 8,224,032 B2 | 7/2012 | Fuchs et al. |
| 8,260,483 B2 | 9/2012 | Barfoot et al. |
| 8,269,984 B2 | 9/2012 | Hinderling et al. |
| 8,276,286 B2 | 10/2012 | Bailey et al. |
| 8,284,407 B2 | 10/2012 | Briggs et al. |
| 8,310,653 B2 | 11/2012 | Ogawa et al. |
| 8,321,612 B2 | 11/2012 | Hartwich et al. |
| 8,346,392 B2 | 1/2013 | Walser et al. |
| 8,346,480 B2 | 1/2013 | Trepagnier et al. |
| 8,352,212 B2 | 1/2013 | Fetter et al. |
| 8,353,059 B2 | 1/2013 | Crampton et al. |
| D676,341 S | 2/2013 | Bailey et al. |
| 8,379,191 B2 | 2/2013 | Braunecker et al. |
| 8,381,704 B2 | 2/2013 | Debelak et al. |
| 8,384,914 B2 | 2/2013 | Becker et al. |
| 8,391,565 B2 | 3/2013 | Purcell et al. |
| 8,402,669 B2 | 3/2013 | Ferrari et al. |
| 8,422,035 B2 | 4/2013 | Hinderling et al. |
| 8,497,901 B2 | 7/2013 | Pettersson |
| 8,533,967 B2 | 9/2013 | Bailey et al. |
| 8,537,374 B2 | 9/2013 | Briggs et al. |
| 8,619,265 B2 | 12/2013 | Steffey et al. |
| 8,645,022 B2 | 2/2014 | Yoshimura et al. |
| 8,659,748 B2 | 2/2014 | Dakin et al. |
| 8,659,752 B2 | 2/2014 | Cramer et al. |
| 8,677,643 B2 | 3/2014 | Bridges et al. |
| 8,683,709 B2 | 4/2014 | York |
| 8,699,007 B2 | 4/2014 | Becker et al. |
| 8,705,012 B2 | 4/2014 | Greiner et al. |
| 8,705,016 B2 | 4/2014 | Schumann et al. |
| 8,718,837 B2 | 5/2014 | Wang et al. |
| 8,784,425 B2 | 7/2014 | Ritchey et al. |
| 8,797,552 B2 | 8/2014 | Suzuki et al. |
| 8,830,485 B2 | 9/2014 | Woloschyn |
| 2001/0004269 A1 | 6/2001 | Shibata et al. |
| 2002/0032541 A1 | 3/2002 | Raab et al. |
| 2002/0059042 A1 | 5/2002 | Kacyra et al. |
| 2002/0087233 A1 | 7/2002 | Raab |
| 2002/0128790 A1 | 9/2002 | Woodmansee |
| 2002/0143506 A1 | 10/2002 | D'Aligny et al. |
| 2002/0149694 A1 | 10/2002 | Seo |
| 2002/0170192 A1 | 11/2002 | Steffey et al. |
| 2002/0176097 A1 | 11/2002 | Rodgers |
| 2003/0002055 A1 | 1/2003 | Kilthau et al. |
| 2003/0033104 A1 | 2/2003 | Gooche |
| 2003/0043386 A1 | 3/2003 | Froehlich et al. |
| 2003/0053037 A1 | 3/2003 | Blaesing-Bangert et al. |
| 2003/0066954 A1 | 4/2003 | Hipp |
| 2003/0090646 A1 | 5/2003 | Riegl et al. |
| 2003/0125901 A1 | 7/2003 | Steffey et al. |
| 2003/0137449 A1 | 7/2003 | Vashisth et al. |
| 2003/0142631 A1 | 7/2003 | Silvester |
| 2003/0167647 A1 | 9/2003 | Raab et al. |
| 2003/0172536 A1 | 9/2003 | Raab et al. |
| 2003/0172537 A1 | 9/2003 | Raab et al. |
| 2003/0179361 A1 | 9/2003 | Ohtomo et al. |
| 2003/0208919 A1 | 11/2003 | Raab et al. |
| 2003/0221326 A1 | 12/2003 | Raab et al. |
| 2004/0004727 A1 | 1/2004 | Yanagisawa et al. |
| 2004/0022416 A1 | 2/2004 | Lemelson et al. |
| 2004/0027554 A1 | 2/2004 | Ishinabe et al. |
| 2004/0040166 A1 | 3/2004 | Raab et al. |
| 2004/0103547 A1 | 6/2004 | Raab et al. |
| 2004/0111908 A1 | 6/2004 | Raab et al. |
| 2004/0119020 A1 | 6/2004 | Bodkin |
| 2004/0139265 A1 | 7/2004 | Hocker et al. |
| 2004/0158355 A1 | 8/2004 | Holmqvist et al. |
| 2004/0162700 A1 | 8/2004 | Rosenberg et al. |
| 2004/0179570 A1 | 9/2004 | Vitruk et al. |

(56) References Cited

U.S. PATENT DOCUMENTS

| | | |
|---|---|---|
| 2004/0221790 A1 | 11/2004 | Sinclair et al. |
| 2004/0246462 A1 | 12/2004 | Kaneko et al. |
| 2004/0246589 A1 | 12/2004 | Kim et al. |
| 2004/0259533 A1 | 12/2004 | Nixon et al. |
| 2005/0016008 A1 | 1/2005 | Raab et al. |
| 2005/0024625 A1 | 2/2005 | Mori et al. |
| 2005/0028393 A1 | 2/2005 | Raab et al. |
| 2005/0046823 A1 | 3/2005 | Ando et al. |
| 2005/0058332 A1 | 3/2005 | Kaufman et al. |
| 2005/0082262 A1 | 4/2005 | Rueb et al. |
| 2005/0085940 A1 | 4/2005 | Griggs et al. |
| 2005/0111514 A1 | 5/2005 | Matsumoto et al. |
| 2005/0115092 A1 | 6/2005 | Raab et al. |
| 2005/0141052 A1 | 6/2005 | Becker et al. |
| 2005/0144799 A1 | 7/2005 | Raab et al. |
| 2005/0150123 A1 | 7/2005 | Eaton |
| 2005/0151963 A1 | 7/2005 | Pulla et al. |
| 2005/0166413 A1 | 8/2005 | Crampton |
| 2005/0172503 A1 | 8/2005 | Kumagai et al. |
| 2005/0188557 A1 | 9/2005 | Raab et al. |
| 2005/0190384 A1 | 9/2005 | Persi et al. |
| 2005/0259271 A1 | 11/2005 | Christoph |
| 2005/0276466 A1 | 12/2005 | Vaccaro et al. |
| 2005/0283989 A1 | 12/2005 | Pettersson |
| 2006/0016086 A1 | 1/2006 | Raab et al. |
| 2006/0017720 A1 | 1/2006 | Li |
| 2006/0026851 A1 | 2/2006 | Raab et al. |
| 2006/0028203 A1 | 2/2006 | Kawashima et al. |
| 2006/0053647 A1 | 3/2006 | Raab et al. |
| 2006/0056459 A1 | 3/2006 | Stratton et al. |
| 2006/0056559 A1 | 3/2006 | Pleasant et al. |
| 2006/0059270 A1 | 3/2006 | Pleasant et al. |
| 2006/0066836 A1 | 3/2006 | Bridges et al. |
| 2006/0088044 A1 | 4/2006 | Hammerl et al. |
| 2006/0096108 A1 | 5/2006 | Raab et al. |
| 2006/0103853 A1 | 5/2006 | Palmateer |
| 2006/0123649 A1 | 6/2006 | Muller |
| 2006/0129349 A1 | 6/2006 | Raab et al. |
| 2006/0132803 A1 | 6/2006 | Clair et al. |
| 2006/0145703 A1 | 7/2006 | Steinbichler et al. |
| 2006/0169050 A1 | 8/2006 | Kobayashi et al. |
| 2006/0170870 A1 | 8/2006 | Kaufman et al. |
| 2006/0182314 A1 | 8/2006 | England et al. |
| 2006/0186301 A1 | 8/2006 | Dozier et al. |
| 2006/0193521 A1 | 8/2006 | England, III et al. |
| 2006/0241791 A1 | 10/2006 | Pokorny et al. |
| 2006/0244746 A1 | 11/2006 | England et al. |
| 2006/0245717 A1 | 11/2006 | Ossig et al. |
| 2006/0279246 A1 | 12/2006 | Hashimoto et al. |
| 2006/0282574 A1 | 12/2006 | Zotov et al. |
| 2006/0287769 A1 | 12/2006 | Yanagita et al. |
| 2006/0291970 A1 | 12/2006 | Granger |
| 2007/0030841 A1 | 2/2007 | Lee et al. |
| 2007/0043526 A1 | 2/2007 | De Jonge et al. |
| 2007/0050774 A1 | 3/2007 | Eldson et al. |
| 2007/0055806 A1 | 3/2007 | Stratton et al. |
| 2007/0058162 A1 | 3/2007 | Granger |
| 2007/0097382 A1 | 5/2007 | Granger |
| 2007/0100498 A1 | 5/2007 | Matsumoto et al. |
| 2007/0105238 A1 | 5/2007 | Mandl et al. |
| 2007/0118269 A1 | 5/2007 | Gibson et al. |
| 2007/0122250 A1 | 5/2007 | Mullner |
| 2007/0142970 A1 | 6/2007 | Burbank et al. |
| 2007/0147265 A1 | 6/2007 | Eidson |
| 2007/0147435 A1 | 6/2007 | Hamilton et al. |
| 2007/0147562 A1 | 6/2007 | Eidson |
| 2007/0150111 A1 | 6/2007 | Wu et al. |
| 2007/0151390 A1 | 7/2007 | Blumenkranz et al. |
| 2007/0153297 A1 | 7/2007 | Lau |
| 2007/0163134 A1 | 7/2007 | Eaton |
| 2007/0163136 A1 | 7/2007 | Eaton |
| 2007/0171394 A1 | 7/2007 | Steiner et al. |
| 2007/0176648 A1 | 8/2007 | Baer |
| 2007/0177016 A1 | 8/2007 | Wu |
| 2007/0181685 A1 | 8/2007 | Zhu et al. |
| 2007/0183459 A1 | 8/2007 | Eidson |
| 2007/0185682 A1 | 8/2007 | Eidson |
| 2007/0217169 A1 | 9/2007 | Yeap et al. |
| 2007/0217170 A1 | 9/2007 | Yeap et al. |
| 2007/0223477 A1 | 9/2007 | Eidson |
| 2007/0229801 A1 | 10/2007 | Tearney et al. |
| 2007/0247615 A1 | 10/2007 | Bridges et al. |
| 2007/0248122 A1 | 10/2007 | Hamilton |
| 2007/0256311 A1 | 11/2007 | Ferrari |
| 2007/0257660 A1 | 11/2007 | Pleasant et al. |
| 2007/0258378 A1 | 11/2007 | Hamilton |
| 2007/0282564 A1 | 12/2007 | Sprague et al. |
| 2007/0294045 A1 | 12/2007 | Atwell et al. |
| 2008/0046221 A1 | 2/2008 | Stathis |
| 2008/0052808 A1 | 3/2008 | Leick et al. |
| 2008/0052936 A1 | 3/2008 | Briggs et al. |
| 2008/0066583 A1 | 3/2008 | Lott |
| 2008/0068103 A1 | 3/2008 | Cutler |
| 2008/0075325 A1 | 3/2008 | Otani et al. |
| 2008/0075326 A1 | 3/2008 | Otani et al. |
| 2008/0080562 A1 | 4/2008 | Burch et al. |
| 2008/0096108 A1 | 4/2008 | Sumiyama et al. |
| 2008/0098272 A1 | 4/2008 | Fairbanks et al. |
| 2008/0148585 A1 | 6/2008 | Raab et al. |
| 2008/0154538 A1 | 6/2008 | Stathis |
| 2008/0179206 A1 | 7/2008 | Feinstein et al. |
| 2008/0183065 A1 | 7/2008 | Goldbach |
| 2008/0196260 A1 | 8/2008 | Pettersson |
| 2008/0204699 A1 | 8/2008 | Benz et al. |
| 2008/0216552 A1 | 9/2008 | Ibach et al. |
| 2008/0218728 A1 | 9/2008 | Kirschner |
| 2008/0228331 A1 | 9/2008 | McNerney et al. |
| 2008/0232269 A1 | 9/2008 | Tatman et al. |
| 2008/0235969 A1 | 10/2008 | Jordil et al. |
| 2008/0235970 A1 | 10/2008 | Crampton |
| 2008/0240321 A1 | 10/2008 | Narus et al. |
| 2008/0246943 A1 | 10/2008 | Kaufman et al. |
| 2008/0252671 A1 | 10/2008 | Cannell et al. |
| 2008/0256814 A1 | 10/2008 | Pettersson |
| 2008/0257023 A1 | 10/2008 | Jordil et al. |
| 2008/0263411 A1 | 10/2008 | Baney et al. |
| 2008/0271332 A1 | 11/2008 | Jordil et al. |
| 2008/0282564 A1 | 11/2008 | Pettersson |
| 2008/0295349 A1 | 12/2008 | Uhl et al. |
| 2008/0298254 A1 | 12/2008 | Eidson |
| 2008/0302200 A1 | 12/2008 | Tobey |
| 2008/0309460 A1 | 12/2008 | Jefferson et al. |
| 2008/0309546 A1 | 12/2008 | Wakayama et al. |
| 2009/0000136 A1 | 1/2009 | Crampton |
| 2009/0010740 A1 | 1/2009 | Ferrari |
| 2009/0013548 A1 | 1/2009 | Ferrari |
| 2009/0016475 A1 | 1/2009 | Rischar et al. |
| 2009/0021351 A1 | 1/2009 | Beniyama et al. |
| 2009/0031575 A1 | 2/2009 | Tomelleri |
| 2009/0046140 A1 | 2/2009 | Lashmet et al. |
| 2009/0046895 A1 | 2/2009 | Pettersson et al. |
| 2009/0049704 A1 | 2/2009 | Styles et al. |
| 2009/0051938 A1 | 2/2009 | Miousset et al. |
| 2009/0083985 A1 | 4/2009 | Ferrari |
| 2009/0089004 A1 | 4/2009 | Vook et al. |
| 2009/0089078 A1 | 4/2009 | Bursey |
| 2009/0089233 A1 | 4/2009 | Gach et al. |
| 2009/0089623 A1 | 4/2009 | Neering et al. |
| 2009/0095047 A1 | 4/2009 | Patel et al. |
| 2009/0100949 A1 | 4/2009 | Shirai et al. |
| 2009/0109797 A1 | 4/2009 | Eidson |
| 2009/0113183 A1 | 4/2009 | Barford et al. |
| 2009/0113229 A1 | 4/2009 | Cataldo et al. |
| 2009/0122805 A1 | 5/2009 | Epps et al. |
| 2009/0125196 A1 | 5/2009 | Velazquez et al. |
| 2009/0133276 A1 | 5/2009 | Bailey et al. |
| 2009/0139105 A1 | 6/2009 | Granger |
| 2009/0157419 A1 | 6/2009 | Bursey |
| 2009/0161091 A1 | 6/2009 | Yamamoto |
| 2009/0165317 A1 | 7/2009 | Little |
| 2009/0177435 A1 | 7/2009 | Heininen |
| 2009/0177438 A1 | 7/2009 | Raab |
| 2009/0185741 A1 | 7/2009 | Nahari et al. |
| 2009/0187373 A1 | 7/2009 | Atwell et al. |

(56) References Cited

U.S. PATENT DOCUMENTS

| | | |
|---|---|---|
| 2009/0241360 A1 | 10/2009 | Tait et al. |
| 2009/0249634 A1 | 10/2009 | Pettersson |
| 2009/0265946 A1 | 10/2009 | Jordil et al. |
| 2009/0273771 A1 | 11/2009 | Gittinger et al. |
| 2009/0299689 A1 | 12/2009 | Stubben et al. |
| 2009/0323121 A1 | 12/2009 | Valkenburg et al. |
| 2009/0323742 A1 | 12/2009 | Kumano |
| 2010/0040742 A1 | 2/2010 | Dijkhuis et al. |
| 2010/0057392 A1 | 3/2010 | York |
| 2010/0078866 A1 | 4/2010 | Pettersson |
| 2010/0095542 A1 | 4/2010 | Ferrari |
| 2010/0122920 A1 | 5/2010 | Butter et al. |
| 2010/0123892 A1 | 5/2010 | Miller et al. |
| 2010/0128259 A1 | 5/2010 | Bridges et al. |
| 2010/0134596 A1 | 6/2010 | Becker |
| 2010/0135534 A1 | 6/2010 | Weston et al. |
| 2010/0148013 A1 | 6/2010 | Bhotika et al. |
| 2010/0188504 A1 | 7/2010 | Dimsdale et al. |
| 2010/0195086 A1 | 8/2010 | Ossig et al. |
| 2010/0207938 A1 | 8/2010 | Yau et al. |
| 2010/0208062 A1 | 8/2010 | Pettersson |
| 2010/0245851 A1 | 9/2010 | Teodorescu |
| 2010/0277747 A1 | 11/2010 | Rueb et al. |
| 2010/0281705 A1 | 11/2010 | Verdi et al. |
| 2010/0286941 A1 | 11/2010 | Merlot |
| 2010/0312524 A1 | 12/2010 | Siercks et al. |
| 2010/0318319 A1 | 12/2010 | Maierhofer |
| 2010/0325907 A1 | 12/2010 | Tait |
| 2011/0000095 A1 | 1/2011 | Carlson |
| 2011/0007305 A1 | 1/2011 | Bridges et al. |
| 2011/0007326 A1 | 1/2011 | Daxauer et al. |
| 2011/0013199 A1 | 1/2011 | Siercks et al. |
| 2011/0019155 A1 | 1/2011 | Daniel et al. |
| 2011/0023578 A1 | 2/2011 | Grasser |
| 2011/0025905 A1 | 2/2011 | Tanaka |
| 2011/0043515 A1 | 2/2011 | Stathis |
| 2011/0107611 A1 | 5/2011 | Desforges et al. |
| 2011/0107612 A1 | 5/2011 | Ferrari et al. |
| 2011/0107613 A1 | 5/2011 | Tait |
| 2011/0107614 A1 | 5/2011 | Champ |
| 2011/0111849 A1 | 5/2011 | Sprague et al. |
| 2011/0112786 A1 | 5/2011 | Desforges et al. |
| 2011/0119025 A1 | 5/2011 | Fetter et al. |
| 2011/0123097 A1 | 5/2011 | Van Coppenolle et al. |
| 2011/0164114 A1 | 7/2011 | Kobayashi et al. |
| 2011/0166824 A1 | 7/2011 | Haisty et al. |
| 2011/0169924 A1 | 7/2011 | Haisty et al. |
| 2011/0173823 A1 | 7/2011 | Bailey et al. |
| 2011/0173827 A1 | 7/2011 | Bailey et al. |
| 2011/0173828 A1 | 7/2011 | York |
| 2011/0178755 A1 | 7/2011 | York |
| 2011/0178758 A1 | 7/2011 | Atwell et al. |
| 2011/0178762 A1 | 7/2011 | York |
| 2011/0178764 A1 | 7/2011 | York |
| 2011/0178765 A1 | 7/2011 | Atwell et al. |
| 2011/0192043 A1 | 8/2011 | Ferrari |
| 2011/0273568 A1 | 11/2011 | Lagassey |
| 2011/0282622 A1 | 11/2011 | Canter et al. |
| 2011/0288684 A1 | 11/2011 | Farlow et al. |
| 2012/0019806 A1 | 1/2012 | Becker et al. |
| 2012/0035788 A1 | 2/2012 | Trepagnier et al. |
| 2012/0044476 A1 | 2/2012 | Earhart et al. |
| 2012/0046820 A1 | 2/2012 | Allard et al. |
| 2012/0069325 A1 | 3/2012 | Schumann et al. |
| 2012/0069352 A1 | 3/2012 | Ossig et al. |
| 2012/0113913 A1 | 5/2012 | Tiirola et al. |
| 2012/0140244 A1 | 6/2012 | Gittinger et al. |
| 2012/0154786 A1 | 6/2012 | Gosch et al. |
| 2012/0155744 A1 | 6/2012 | Kennedy et al. |
| 2012/0169876 A1 | 7/2012 | Reichert et al. |
| 2012/0197439 A1 | 8/2012 | Wang et al. |
| 2012/0217357 A1 | 8/2012 | Franke |
| 2012/0229788 A1 | 9/2012 | Schumann et al. |
| 2012/0260512 A1 | 10/2012 | Kretschmer et al. |
| 2012/0262700 A1 | 10/2012 | Schumann et al. |
| 2012/0287265 A1 | 11/2012 | Schumann et al. |
| 2013/0010307 A1 | 1/2013 | Greiner et al. |
| 2013/0025143 A1 | 1/2013 | Bailey et al. |
| 2013/0025144 A1 | 1/2013 | Briggs et al. |
| 2013/0027515 A1 | 1/2013 | Vinther et al. |
| 2013/0070250 A1 | 3/2013 | Ditte et al. |
| 2013/0094024 A1 | 4/2013 | Ruhland et al. |
| 2013/0097882 A1 | 4/2013 | Bridges et al. |
| 2013/0125408 A1 | 5/2013 | Atwell et al. |
| 2013/0162472 A1 | 6/2013 | Najim et al. |
| 2013/0176453 A1 | 7/2013 | Mate et al. |
| 2013/0201487 A1 | 8/2013 | Ossig et al. |
| 2013/0205606 A1 | 8/2013 | Briggs et al. |
| 2013/0212889 A9 | 8/2013 | Bridges et al. |
| 2013/0222816 A1 | 8/2013 | Briggs et al. |
| 2013/0300740 A1 | 11/2013 | Snyder et al. |
| 2014/0002608 A1 | 1/2014 | Atwell et al. |
| 2014/0049784 A1 | 2/2014 | Woloschyn et al. |
| 2014/0063489 A1 | 3/2014 | Steffey et al. |
| 2014/0240690 A1 | 8/2014 | Newman et al. |

FOREIGN PATENT DOCUMENTS

| | | |
|---|---|---|
| CN | 1307241 A | 8/2001 |
| CN | 2508896 Y | 9/2002 |
| CN | 2665668 Y | 12/2004 |
| CN | 1630804 A | 6/2005 |
| CN | 1630805 A | 6/2005 |
| CN | 1688867 A | 10/2005 |
| CN | 1812868 A | 8/2006 |
| CN | 1818537 A | 8/2006 |
| CN | 1839293 A | 9/2006 |
| CN | 1853084 A | 10/2006 |
| CN | 101024286 A | 8/2007 |
| CN | 101156043 A | 4/2008 |
| CN | 101163939 A | 4/2008 |
| CN | 101371099 A | 2/2009 |
| CN | 201266071 Y | 7/2009 |
| CN | 101511529 A | 8/2009 |
| DE | 3245060 A1 | 7/1983 |
| DE | 4410775 A1 | 10/1995 |
| DE | 29622033 U1 | 2/1997 |
| DE | 19543763 A1 | 5/1997 |
| DE | 19601875 A1 | 7/1997 |
| DE | 19720049 A1 | 11/1998 |
| DE | 19811550 A1 | 9/1999 |
| DE | 19820307 A1 | 11/1999 |
| DE | 19850118 A1 | 5/2000 |
| DE | 19928958 A1 | 11/2000 |
| DE | 10026357 | 1/2002 |
| DE | 10137241 A1 | 9/2002 |
| DE | 10155488 A1 | 5/2003 |
| DE | 10232028 | 2/2004 |
| DE | 10244643 A1 | 4/2004 |
| DE | 10304188 A1 | 8/2004 |
| DE | 10326848 A1 | 1/2005 |
| DE | 202005000983 U1 | 4/2005 |
| DE | 10361870 A | 7/2005 |
| DE | 102004015668 B3 | 9/2005 |
| DE | 102004015111 A1 | 10/2005 |
| DE | 102004028090 A1 | 12/2005 |
| DE | 19720049 B4 | 1/2006 |
| DE | 10114126 B4 | 8/2006 |
| DE | 102004010083 B4 | 11/2006 |
| DE | 102005043931 A1 | 3/2007 |
| DE | 102005060967 A1 | 6/2007 |
| DE | 102006023902 A1 | 11/2007 |
| DE | 102006024534 A1 | 11/2007 |
| DE | 102006035292 | 1/2008 |
| DE | 202006020299 U1 | 5/2008 |
| DE | 102007037162 A1 | 2/2009 |
| DE | 102008039838 | 3/2010 |
| DE | 102005036929 B4 | 6/2010 |
| DE | 102008062763 B3 | 7/2010 |
| DE | 102009001894 A1 | 9/2010 |
| DE | 102010032725 A1 | 1/2012 |
| DE | 102012107544 B3 | 5/2013 |
| DE | 102012109481 A1 | 4/2014 |
| EP | 0546784 A2 | 6/1993 |

(56) References Cited

FOREIGN PATENT DOCUMENTS

| | | |
|---|---|---|
| EP | 0667549 A2 | 8/1995 |
| EP | 0727642 A1 | 8/1996 |
| EP | 0730210 | 9/1996 |
| EP | 0614517 | 3/1997 |
| EP | 1160539 | 12/2001 |
| EP | 1189124 A1 | 3/2002 |
| EP | 0767357 B1 | 5/2002 |
| EP | 1342989 A2 | 9/2003 |
| EP | 1361414 A1 | 11/2003 |
| EP | 1429109 A2 | 6/2004 |
| EP | 1452279 A1 | 9/2004 |
| EP | 1468791 A1 | 10/2004 |
| EP | 1669713 A1 | 6/2006 |
| EP | 1734425 A2 | 12/2006 |
| EP | 1429109 B1 | 4/2007 |
| EP | 1764579 B1 | 12/2007 |
| EP | 1878543 A2 | 1/2008 |
| EP | 1967930 A2 | 9/2008 |
| EP | 2003419 A1 | 12/2008 |
| EP | 2023077 A1 | 2/2009 |
| EP | 2042905 A1 | 4/2009 |
| EP | 2060530 A1 | 5/2009 |
| EP | 2068067 A1 | 6/2009 |
| EP | 2108917 A1 | 10/2009 |
| EP | 2177868 A2 | 10/2009 |
| EP | 2259013 A1 | 12/2010 |
| EP | 2400261 A1 | 12/2011 |
| FR | 2603228 A1 | 3/1988 |
| FR | 2935043 A1 | 2/2010 |
| GB | 894320 | 4/1962 |
| GB | 2255648 A | 11/1992 |
| GB | 2341203 A | 3/2000 |
| GB | 2420241 A | 5/2006 |
| GB | 2452033 | 2/2009 |
| JP | 5581525 | 6/1955 |
| JP | S575584 A | 1/1982 |
| JP | 58171291 | 1/1983 |
| JP | 5827264 | 2/1983 |
| JP | S58171291 A | 10/1983 |
| JP | S61157095 A | 7/1986 |
| JP | 63135814 A | 6/1988 |
| JP | 0357911 A | 3/1991 |
| JP | 04115108 A | 4/1992 |
| JP | 04225188 | 8/1992 |
| JP | 04267214 A | 9/1992 |
| JP | 0572477 A | 3/1993 |
| JP | 6313710 A | 8/1994 |
| JP | 06313710 | 11/1994 |
| JP | 1994313710 A | 11/1994 |
| JP | 06341838 | 12/1994 |
| JP | 074950 A | 1/1995 |
| JP | 7210586 A | 8/1995 |
| JP | 07229963 A | 8/1995 |
| JP | 08129145 A | 5/1996 |
| JP | 08136849 A | 5/1996 |
| JP | 08262140 A | 10/1996 |
| JP | 0921868 | 1/1997 |
| JP | 10213661 A | 8/1998 |
| JP | 2000121724 A | 4/2000 |
| JP | 2000249546 A | 9/2000 |
| JP | 2001013001 A | 1/2001 |
| JP | 2001021303 A | 1/2001 |
| JP | 2001066211 A | 3/2001 |
| JP | 2001337278 A | 12/2001 |
| JP | 2003050128 A | 2/2003 |
| JP | 2003156562 A | 5/2003 |
| JP | 2003194526 A | 7/2003 |
| JP | 2003216255 A | 7/2003 |
| JP | 2003308205 A | 10/2003 |
| JP | 2004109106 A | 4/2004 |
| JP | 2004245832 A | 9/2004 |
| JP | 2004257927 A | 9/2004 |
| JP | 2004333398 A | 11/2004 |
| JP | 2004348575 A | 12/2004 |
| JP | 2005030937 A | 2/2005 |
| JP | 2005069700 A | 3/2005 |
| JP | 2005174887 A | 6/2005 |
| JP | 2005517908 A | 6/2005 |
| JP | 2005215917 A | 8/2005 |
| JP | 2005221336 A | 8/2005 |
| JP | 2005257510 A | 9/2005 |
| JP | 2006203404 A | 8/2006 |
| JP | 2006226948 A | 8/2006 |
| JP | 2006241833 A | 9/2006 |
| JP | 2006301991 A | 11/2006 |
| JP | 2009524057 A | 6/2009 |
| JP | 2013516928 A | 5/2013 |
| JP | 2013517508 A | 5/2013 |
| JP | 2013117417 A | 6/2013 |
| JP | 2013543970 A | 12/2013 |
| WO | 8801924 A1 | 3/1988 |
| WO | 9208568 A1 | 5/1992 |
| WO | 9808050 | 2/1998 |
| WO | 9910706 A1 | 3/1999 |
| WO | 0014474 | 3/2000 |
| WO | 0020880 A2 | 4/2000 |
| WO | 0026612 A1 | 5/2000 |
| WO | 0033149 | 6/2000 |
| WO | 0034733 | 6/2000 |
| WO | 0063681 A2 | 10/2000 |
| WO | 0177613 A1 | 10/2001 |
| WO | 02088855 A1 | 11/2002 |
| WO | 02101323 A2 | 12/2002 |
| WO | 2004096502 A1 | 11/2004 |
| WO | 2005072917 A1 | 8/2005 |
| WO | 2005075875 A1 | 8/2005 |
| WO | 2005100908 A1 | 10/2005 |
| WO | 2006014445 A1 | 2/2006 |
| WO | 2006051264 A1 | 5/2006 |
| WO | 2007002319 A1 | 1/2007 |
| WO | 2007028941 A1 | 3/2007 |
| WO | 2007051972 A1 | 5/2007 |
| WO | 2007118478 A1 | 10/2007 |
| WO | 2007125081 A1 | 11/2007 |
| WO | 2007144906 A1 | 12/2007 |
| WO | 2008019856 A1 | 2/2008 |
| WO | 2008027588 A2 | 3/2008 |
| WO | 2008047171 A1 | 4/2008 |
| WO | 2008052348 A1 | 5/2008 |
| WO | 2008064276 A3 | 5/2008 |
| WO | 2008068791 A1 | 6/2008 |
| WO | 2008075170 A1 | 6/2008 |
| WO | WO-2008066896 A2 | 6/2008 |
| WO | 2008121073 A1 | 10/2008 |
| WO | 2008157061 A1 | 12/2008 |
| WO | 2009001165 A1 | 12/2008 |
| WO | 2009016185 A1 | 2/2009 |
| WO | 2009083452 A1 | 7/2009 |
| WO | 2009127526 A1 | 10/2009 |
| WO | 2009130169 A1 | 10/2009 |
| WO | 2009149740 A1 | 12/2009 |
| WO | 2010040742 A1 | 4/2010 |
| WO | 2010092131 A1 | 8/2010 |
| WO | 2010108089 A2 | 9/2010 |
| WO | 2010148525 A1 | 12/2010 |
| WO | 2011000435 A1 | 1/2011 |
| WO | 2011000955 A1 | 1/2011 |
| WO | 2011021103 A1 | 2/2011 |
| WO | 2011029140 A1 | 3/2011 |
| WO | 2011057130 A2 | 5/2011 |
| WO | 2011002908 A1 | 6/2011 |
| WO | 2011090829 A2 | 7/2011 |
| WO | 2011090895 A1 | 7/2011 |
| WO | 2012037157 A2 | 3/2012 |
| WO | 2012038446 A1 | 3/2012 |
| WO | 2012103525 A2 | 8/2012 |
| WO | 2012112683 A2 | 8/2012 |
| WO | 2013188026 A1 | 12/2013 |

(56) References Cited

FOREIGN PATENT DOCUMENTS

| | | |
|---|---|---|
| WO | 2013190031 A1 | 12/2013 |
| WO | 2014128498 A2 | 8/2014 |

OTHER PUBLICATIONS

Written Opinion of the International Searching Authority for Internationl Application No. PCT/US2011/021270 mailed May 2, 2011.
Written Opinion of the International Searching Authority for International Application No. PCT/US2011/021272 mailed Apr. 7, 2011.
Written Opinion of the International Searching Authority for International Application No. PCT/US2011/021273 mailed Apr. 20, 2011.
Written Opinion of the International Searching Authority for International Application No. PCT/US2011/021274 mailed May 6, 2011.
Written Opinion of the International Searching Authority for International Application No. PCT/US2011/021276 mailed May 17, 2011.
Written Opinion of the International Searching Authority for International Application No. PCT/US2011/021278 mailed May 25, 2011.
Written Opinion of the International Searching Authority for International Application No. PCT/US2011/021794 mailed Sep. 23, 2011.
Written Opinion of the International Searching Authority for International Application No. PCT/US2011/050787 mailed Mar. 11, 2011.
Written Opinion of the International Searching Authority for International Application No. PCT/US2011/021253 mailed Mar. 22, 2012.
Written Opinion of the International Searching Authority for International Application No. PCT/US2011/020625 mailed Feb. 25, 2011.
Written Opinion for International Application No. PCT/US2011/021276 filed Jan. 14, 2011.
International Search Report for application PCT/US2013/040733, with a filing date of May 13, 2013, and a mailing date of Aug. 21, 2013, 6 pages.
Written Opinion for application PCT/2013/040733, with a filing date of May 13, 2013, mailing date of Aug. 21, 2013, 7 pages.
International Preliminary Report on Patentability for International Application Serial No. PCT/US2011/021263. International filing date Jan. 14, 2011. Date of Issuance Jul. 24, 2012.
German Office Action and English Language summary for DE 112011100292.0 filed Jul. 3, 2012, based on PCT Application US2011/021252 filed Jan. 14, 2011.
Examination Report under Section 18(3); Report dated Nov. 6, 2012; Application No. GB1210306.5.
GB Office Action dated Jan. 15, 2014 for SJB/PX210785GB; UK Patent Application No. 1214426.7.
A. Hart; "Kinematic Coupling Interchangeability" Precision Engineering; vol. 28, No. 1; Jan. 1, 2004 pp. 1-15.
ABB Flexible Automation AB: "Product Manual IRB 6400R M99, On-line Manual"; Sep. 13, 2006; XP00002657684; Retrieved from the Internet: URL: http://pergatory.mit.edu/kinematiccouplings/case_studies/ABB_Robotics/general/6400R%20Product%20Manual.pdf (retrieved Aug. 26, 2011).
Anonymous : So wird's gemacht: Mit T-DSL und Windows XP Home Edition gemeinsam ins Internet (Teil 3) Internet Citation, Jul. 2003, XP002364586, Retrieved from Internet: URL:http://support.microsfot.com/kb/814538/DE/ [retrieved on Jan. 26, 2006]eh whole document.
GoMeasure3D—Your source for all things measurement, Baces 3D 100 Series Portable CMM from GoMeasure3D, [online], [retrieved Nov. 29, 2011], http://www.gomeasure3d.com/baces100.html.
Cho, et al., Implementation of a Precision Time Protocol over Low Rate Wireless Personal Area Networks, IEEE, 2008.
Cooklev, et al., An Implementation of IEEE 1588 Over IEEE 802.11b for Syncrhonization of Wireless Local Area Network Nodes, IEEE Transactions on Instrumentation and Measurement, vol. 56, No. 5, Oct. 2007.
Information on Electro-Optical Information Systems; EOIS 3D Mini-Moire C.M.M. Sensor for Non-Contact Measuring & Surface Mapping; Direct Dimensions, Jun. 1995.
Dylan, Craig R., High Precision Makes the Massive Bay Bridge Project Work. Suspended in MidAir—Cover Story—Point of Beginning, Jan. 1, 2010, [online] http://www.pobonline.com/Articles/Cover_Story/BNP_GUID_9-5-2006_A_10000000000 . . . [Retreived Jan. 25, 2010].
Franklin, Paul F., What IEEE 1588 Means for Your Next T&M System Design, Keithley Instruments, Inc., [on-line] Oct. 19, 2010, http://www.eetimes.com/General/DisplayPrintViewContent?contentItemId=4209746, [Retreived Oct. 21, 2010].
It is Alive in the Lab, Autodesk University, Fun with the Immersion MicroScribe Laser Scanner, [online], [retrieved Nov. 29, 2011], http://labs.blogs.com/its_alive_in_the_lab/2007/11/fun-with-the-im.html.
Ghost 3D Systems, Authorized MicroScribe Solutions, FAQs—MicroScribe 3D Laser, MicroScan Tools, & related info, [online], [retrieved Nov. 29, 2011], http://microscribe.ghost3d.com/gt_microscan-3d_faqs.htm,.
Electro-Optical Information Systems, "The Handy Handheld Digitizer" [online], [retrieved on Nov. 29, 2011], http://vidibotics.com/htm/handy.htm.
HYDROpro Navigation, Hydropgraphic Survey Software, Trimble, www.trimble.com, Copyright 1997-2003.
International Preliminary Report on Patentability for International Application No. PCT/US2011/021253; Date of Completion May 9, 2012.
International Preliminary Report on Patentability for PCT/US2011/021274; Date of Completion Apr. 12, 2012.
International Search Report for International Application No. PCT/2011/020625 mailed Feb. 25, 2011.
International Search Report for International Application No. PCT/US2011/021270 mailed May 2, 2011.
International Search Report for International Application No. PCT/US2011/021274 mailed May 6, 2011.
International Search Report for International Application No. PCT2011/021276 filed Jan. 14, 2011.
International Search Report for International Application No. PCT/US2011/021246 mailed Apr. 12, 2011.
International Search Report for International Application No. PCT/US2011/021248 mailed Sep. 19, 2011.
International Search Report for International Application No. PCT/US2011/021249 mailed Apr. 21, 2011.
International Search Report for International Application No. PCT/US2011/021250 mailed Apr. 18, 2011.
International Search Report for International Application No. PCT/US2011/021252 mailed Apr. 27, 2011.
International Search Report for International Application No. PCT/US2011/021253 mailed Sep. 26, 2011.
International Search Report for International Application No. PCT/US2011/021259 mailed May 25, 2011.
International Search Report for International Application No. PCT/US2011/021262 mailed May 11, 2011.
International Search Report for International Application No. PCT/US2011/021263 mailed May 4, 2011.
International Search Report for International Application No. PCT/US2011/021264 mailed May 31, 2011.
International Search Report for International Application No. PCT/US2011/021272 mailed Apr. 7, 2011.
International Search Report for International Application No. PCT/US2011/021273 mailed Apr. 20, 2011.
International Preliminary Report on Patentability for International Application Serial No. PCT/US2011/021263. International filing date Jan. 14, 2011. Date of Issuance Jul. 24, 2012, 12 pages.
International Preliminary Report on Patentability for International Application Serial No. PCT/US2011/021272. International filing date Jan. 14, 2011. Date of Issuance Jul. 24, 2012, 11 pages.

(56) References Cited

OTHER PUBLICATIONS

Moog Components Group; "Fiber Optic Rotary Joints; Product Guide" (4 pages) Dec. 2010; MOOG, Inc. 2010.
Moog Components Group "Technical Brief; Fiber Optic Rotary Joints" Document No. 303 (6 pages) Mar. 2008; MOOG, Inc. 2008 Canada; Focal Technologies.
International Search Report dated Nov. 28, 2013 for International Application No. PCT/13/049562 filed Jul. 8, 2013 (7 pages).
Written Opinion of the International Search Authority dated Nov. 28, 2013 for International Application No. PCT/13/049562 filed Jul. 8, 2013 (10 pages).
M.G. Lee; "Compact 3D LIDAR based on optically coupled horizontal and vertical Scanning mechanism for the autonomous navigation of robots" (13 pages) vol. 8037; downloaded from http://proceedings.spiedigitallibrary.org/ on Jul. 2, 2013.
J. Geng "DLP-Based Structured Light 3D Imaging Technologies and Applications" (15 pages) Emerging Digital Micromirror Device Based Systems and Application III; edited by Michael R. Douglass, Patrick I. Oden, Proc. of SPIE, vol. 7932, 79320B; (2011) SPIE.
Examination Report for German Application No. 11 2011 100 290.4 Report dated Jul. 16, 2013; based on PCT/US2011/021247, 1 page.
P. Ben-Tzvi, et al "Extraction of 3D Images Using Pitch-Actuated 2D Laser Range Finder for Robotic Vision" (6 pages) BNSDOCID <XP 31840390A_1_>.
International Search Report for International Application No. PCT/US/2013/041826 filed May 20, 2013; mailed Jul. 29, 2013, 5 pages.
International Search Report for International Application No. PCT/US2013/040309 mailed Jul. 15, 2013, 4 pages.
International Search Report for International Application No. PCT/US2013/040321 mailed Jul. 15, 2013, 4 pages.
International Search Report of the International Searching Authority for Application No. PCT/US2013/022186; Date of Mailing: May 29, 2013, 4 pages.
YK Cho, et al. "Light-weight 3D LADAR System for Construction Robotic Operations" (pp. 237-244); 26th International Symposium on Automation and Robotics in Construction (ISARC 2009).
Romer "Romer Measuring Arms Portable CMMs for R&D and shop floor" (Mar. 2009) Hexagon Metrology (16 pages).
Written Opinion for International Application No. PCT/US/2013/041826 filed May 20, 2013; mailed Jul. 29, 2013, 7 pages.
Written Opinion for International Application No. PCT/US2013/040309 mailed Jul. 15, 2013, 7 pages.
Written Opinion of the International Searching Authority for Application No. PCT/US2013/022186; Date of Mailing: May 29, 2013, 5 pages.
Written Opinion for International Application No. PCT/US2013/040321 mailed Jul. 15, 2013, 7 pages.
Examination Report under Section 18(3); Report dated Oct. 31, 2012; Application No. GB1210309.9.
Examination Report under Section 18(3); Report dated Nov. 1, 2012; Application No. GB1210311.5.
International Preliminary Report on Patentability for International Application Serial No. PCT/US2011/021246 International filing date Jan. 14, 2011. Date of Issuance Jul. 24, 2012.
International Preliminary Report on Patentability for International Application Serial No. PCT/US2011/021249 International filing date Jan. 14, 2011. Date of Issuance Jul. 24, 2012.
International Preliminary Report on Patentability for International Application Serial No. PCT/US2011/021250 International filing date Jan. 14, 2011. Date of Issuance Jul. 24, 2012.
International Preliminary Report on Patentability for International Application Serial No. PCT/US2011/021252 International filing date Jan. 14, 2011. Date of Issuance Jul. 24, 2012.
International Preliminary Report on Patentability for International Application Serial No. PCT/US2011/021247 International filing date Jan. 14, 2011. Date of Issuance Jul. 24, 2012.
International Preliminary Report on Patentability for International Application Serial No. PCT/US2011/021259. International filing date Jan. 14, 2011. Date of Issuance Jul. 24, 2012.
International Preliminary Report on Patentability for International Application Serial No. PCT/US2011/021262. International filing date Jan. 14, 2011. Date of Issuance Jul. 24, 2012.
International Preliminary Report on Patentability for International Application Serial No. PCT/US2011/021264. International filing date Jan. 14, 2011. Date of Issuance Jul. 24, 2012.
International Preliminary Report on Patentability for International Application Serial No. PCT/US2011/021270. International filing date Jan. 14, 2011. Date of Issuance Jul. 24, 2012.
International Preliminary Report on Patentability for International Application Serial No. PCT/US2011/021273. International filing date Jan. 14, 2011. Date of Issuance Jul. 24, 2012.
International Preliminary Report on Patentability for International Application Serial No. PCT/US2011/021276. International filing date Jan. 14, 2011. Date of Issuance Jul. 24, 2012.
International Preliminary Report on Patentability for International Application Serial No. PCT/US2011/021278. International filing date Jan. 14, 2011. Date of Issuance Jul. 24, 2012.
International Preliminary Report on Patentability for International Application Serial No. PCT/US2011/021794. International filing date Jan. 20, 2011. Date of Issuance Jul. 24, 2012.
International Preliminary Report on Patentability for PCT/US2011/020625; Date of Issuance Jul. 17, 2012.
International Search Report for International Application No. PCT/US2011/021247 mailed Aug. 26, 2011.
Written Opinion of the International Searching Authority for International Application No. PCT/US2011/021247 mailed Aug. 26, 2011.
International Search Report for International Application No. PCT/US2011/021276 mailed May 17, 2011.
International Search Report for International Application No. PCT/US2011/021278 mailed May 25, 2011.
International Search Report for International Application No. PCT/US2011/021794 mailed Sep. 23, 2011.
International Serach Report for International Application No. PCT/US2011/050787; Mailing date Mar. 11, 2011.
Jasperneite, et al., Enhancements to the Time Synchronization Standard IEEE-1588 for a System of Cascaded Bridges, IEEE, 2004.
Kreon Laser Scanners, Getting the Best in Cutting Edge 3D Digitizing Technology, B3-D MCAD Consulting/Sales [online], [retrieved Nov. 29, 2011], http://www.b3-d.com/Kreon.html.
MicroScan 3D User Guide, RSI GmbH, 3D Systems & Software, Oberursel, Germany, email: info@rsi-gmbh.de, Copyright RSI Roland Seifert Imaging GmbH 2008.
Patrick Willoughby; "Elastically Averaged Precision Alignment"; In: "Doctoral Thesis"; Jun. 1, 2005; Massachusetts Institute of Technology; XP55005620; Abstract 1.1 Motivation; Chapter 3, Chapter 6.
Romer "Romer Absolute Arm Maximum Performance Portable Measurement" (Printed Oct. 2010); Hexagon Metrology, Inc. htt://us:ROMER.com; Hexagon Metrology, Inc., 2010.
Romer Romer Absolute Arm Product Brochure: (2010); Hexagon Metrology; www.hexagonmetrology.com; Hexagon AB, 2010.
Sauter, et al., Towards New Hybrid Networks for Industrial Automation, IEEE, 2009.
Spada, et al., IEEE 1588 Lowers Integration Costs in Continuous Flow Automated Production Lines, XP-002498255, ARC Insights, Insight # 2003-33MD&H, Aug. 20, 2003.
Trimble—Trimble SPS630, SPS730 and SPS930 Universal Total Stations, [on-line] http://www.trimble.com/sps630_730_930.shtml (1 of 4), [Retrieved Jan. 26, 2010 8:50:29AM].
Written Opinion of the International Searching Authority for International Application No. PCT/US2011/021246 mailed Apr. 12, 2011.
Written Opinion of the International Searching Authority for International Application No. PCT/US2011/021248 mailed Sep. 19, 2011.
Written Opinion of the International Searching Authority for International Application No. PCT/US2011/021249 mailed Apr. 21, 2011.
Written Opinion of the International Searching Authority for International Application No. PCT/US2011/021250 mailed Apr. 18, 2011.
Written Opinion of the International Searching Authority for International Application No. PCT/US2011/021252 mailed Apr. 27, 2011.

(56) References Cited

OTHER PUBLICATIONS

Written Opinion of the International Searching Authority for International Application No. PCT/US2011/021253 mailed Sep. 26, 2011.
Written Opinion of the International Searching Authority for International Application No. PCT/US2011/021259 mailed May 25, 2011.
Written Opinion of the International Searching Authority for International Application No. PCT/US2011/021262 mailed May 11, 2011.
Written Opinion of the International Searching Authority for International Application No. PCT/US2011/021263 mailed May 4, 2011.
Laser Reverse Engineering with Microscribe, [online], [retrieved Nov. 29, 2011], http://www.youtube.com/watch?v=8VRz_2aEJ4E&feature=PlayList&p=F63ABF74F30DC81B&playnext=1&playnext_from=PL&index=1.
German Patent Application No. 11 2011 100 291.2, Office Action dated Dec. 20, 2012. with english summary, 2 pages.
Examination Report for German Application No. 11 2011 100 193.2 Report dated Dec. 20, 2012; based on PCT/US2011/021249, with english summary, 12 pages.
FARO Product Catalog; Faro Arm; 68 pages; Faro Technologies Inc. 2009; printed Aug. 3, 2009.
Japanese Office Action and English Language summary for JP2012-550042 filed Jul. 20, 2012; based on International Application No. PCT/US2011/021249 filed Jan. 14, 2011, 4 pages.
Japanese Office Action and English Language summary for JP2012-550044 filed Jul. 20, 2012; based on International Application No. PCT/US2011/021252 filed Jan. 14, 2011. 4 pages.
Japanese Office Action and English Language summary for JP2012-550043 filed Jul. 20, 2012; based on International Application No. PCT/US2011/021250 filed Jan. 14, 2011, 4 pages.
Romer Measuring Arms; Portable CMMs for the shop floor; 20 pages; Hexagon Metrology, Inc. (2009) http//us.ROMER.com.
Leica TPS800 Performance Series—Equipment List, 2004.
Brenneke et al: "Using 3D laser range data for slam in outsoor enviornments." Proceedings of the 2003 IEEE/RSJ International Conference on Intelligent Robots and Systems. Las Vegas, NV Oct. 27-31, 2003; IEEE US, vol. 1, Oct. 27, 2003, pp. 188-193.
Gebre, et al. "Remotely Operated and Autonomous Mapping System (ROAMS)." Technologies for Practical Robot Applications, 2009. Tepra 2009. IEEE International Conference on IEEE, Piscataway, NJ, USA. Nov. 9, 2009, pp. 173-178.
Leica Geosystems, TruStory Forensic Analysis by Albuquerque Police Department, 2006.
"Scanner Basis Configuration for Riegl VQ-250", Riegl Company Webpage, Feb. 16, 2011 [retrieved on Apr. 19, 2013]. Retrieved from the internet:, URL:http://www.riegl.com/uploads/tx_pxpriegldownloads/30_SystemConfiguration_VQ-250_02-11_16-02-2011.pdf; 3 pages.
ABB Flexibile Automation AB: "Product Manual IRB 6400R M99, On-line Manual"; Sep. 13, 2006; XP00002657684; [Retrieved on Sep. 28, 2011]. Retrieved from the Internet: URL: http://pergatory.mit.edu/kinematiccouplings/case_studies/ABB_Robotics/general/6400R%20Product%20Manual.pdf; 481 pages.
Akca, Devrim, Full Automated Registration of Laser Scanner Point Clouds, Institute of Geodesy and Photogrammetry, Swiss Federal Institute of Technology, Zuerich, Switzerland; Published Dec. 2003; 8 pages.
Akca, Devrim, Full Automatic Registration of Laser Scanner Point Clouds, Optical 3D Measurement Techniques, vol. VI, 2003, XP002590305, ETH, Swiss Federal Institute of Technology, Zurich, Institute of Geodesy and Photogrammetry, DOI:10.3929/ethz-a-004656; 8 pages.
Bornaz, L., et al., "Multiple Scan Registration in Lidar Close-Range Applications," The International Archives of the Photogrammetry, Remote Sensing and Spatial Information Sciences, vol. XXXIV, Part 5/W12, Jul. 2003, pp. 72-77, XP002590306.
Brenneke, C., et al., "Using 3D Laser Range Data for Slam in Outdoor Environments", Proceedings of the 2003 IEEE/RSJ International Conference on Intelligent Robots and Systems. (IROS 2003); Las Vegas, NV, Oct. 27-31, 2003; [IEEE/RSJ International Conference]; pp. 188-193.
Chinese First Office Action and Search Report for Application No. 2011800005129.6; Issued Nov. 18, 2013, 13 pages.
Chinese Notification of First Office Action for Chinese Application No. 201080003463.3; Issued Oct. 30, 2012 (translated), 15 pages.
Chinese Office Action Dated Jun. 2, 2010 with English Translation of the Text for Application No. 2006800540959; 16 pages.
Chinese Office Action for Application No. 201180004746.4 Mailed Sep. 30, 2014; 9 pages.
Chinese Office Action for Application No. 201180005275.9 Mailed Sep. 3, 2014; 8 pages.
Chinese Office Action for Chinese Appl. No. 201180004443.2 Issued Jan. 29, 2015; 7 pages.
Chinese Office Action for Chinese Application Serial No. 201080047516.1; Date of Issue Apr. 1, 2013; 15 pages.
Chinese Office Action for Chinese Application Serial No. 201180004747.9, Mailed Jul. 1, 2014; 9 pages.
Chinese Office Action for CN Patent Application No. 201180046328.1; Dated Jan. 23, 2014; 15 pages.
Chinese Publication No. CN 1445509, published Oct. 1, 2003—English Abstract Not Available; EP Equivalent 1347267—English Abstract provided; 17 pages.
CN Appln 201080003456.3 Office Action Dated Apr. 30, 2014; 12 pages.
CN Office Action for Application No. 201180004737.5 dated Jun. 26, 2014; 13 pages.
CN Office Action for Application No. 2011800064084 dated Apr. 30, 2014; 11 pages.
CN Office Action re Application No. 201180005600.1 issued Jun. 16, 2014; 13 pages.
CN Office Action re Application No. 201280018596.7 dated Jul. 7, 2014; 25 pages.
CN Office Action re CN Application No. 201180006726.0 dated Jul. 9, 2014; 8 pages.
Decision Revoking the European Patent (Art. 101(3)(b) EPC) dated Aug. 14, 2013, filed in Opposition re Application No. 07 785 873.6/ Patent No. 2 062 069, Proprietor: Faro Technologies, Inc., filed by Leica Geosystem AG on Feb. 5, 2013, 12 pages.
Elstrom, M.D., Stereo-Based Registration of LADAR and Color Imagery, Part of SPIE Conference on Intelligent Robots and Computer Vision XVII: Algorithms, Techniques, and Active Vision, Boston, MA, Nov. 1998, SPIE vol. 3522, 0277-786X/98; [Retrieved on Jan. 26, 2013]; retrieved from the Internet http://proceedings.spiedigitallibrary.org.; 12 pages.
English translation of Japanese Office Action for JP Application No. 2012-521117, issued Mar. 25, 2014; 4 pages.
GB Examination Report dated Aug. 19, 2013 for GB Application No. GB1202398.2.; 4 pages.
English translation of Japanese Office Action for JP Application No. 2012-525222, issued Apr. 2, 2014; 12 pages.
EO Edmund Optics, [online]; [retrieved on Oct. 15, 2013]; retrieved from the Internet http://www.edmundoptics.com/electro-optics/detector-components/silicon-detectors/1305 "Silicon Detectors," 5 pages.
Examination Report for German Application No. 11 2011 100 294.7 dated Nov. 3, 2014; 39 pages.
Examination Report for Application No. GB1214426.7 mailed Oct. 6, 2014; 5 pages.
Examination Report for German Application No. 11 2011 100 289.0 mailed Oct. 9, 2014; 8 pages.
Examination Report under Section 18(3) for Application No. GB1412309.5; 3 pages.
Examination Report under Section 18(3); Report dated Nov. 1, 2012; Application No. GB1210311.5; 7 pages.
Examination Report under Section 18(3); Report dated Oct. 31, 2012; Application No. GB1210309.5; 5 pages.
Examination Report under Section 18(3); Report dated Oct. 31, 2012; Application No. GB1210309.9; 5 pages.
Examination Report for German Application No. 112011100309.9 dated Sep. 23, 2014; 17 pages.

(56) References Cited

OTHER PUBLICATIONS

FARO Laser Scanner LS, Recording Reality's Digital Fingerprint, The Measure of Success, Rev. Aug. 22, 2005; 16 pages.
FARO Laserscanner LS, Presentation Forensic Package, Policeschool of Hessen, Wiesbaden, Germany, Dec. 14, 2005; FARO Technologies, Copyright 2008, 14 pages.
Final Office Action for U.S. Appl. No. 13/0006,524 mailed Feb. 18, 2015; 28 pages.
Final Office Action for U.S. Appl. No. 13/0006/466 mailed Feb. 4, 2015; 45 pages.
First Chinese Office Action for Application No. 201080003467.1; Office Action Issue Date Feb. 5, 2013; (translated); 15 pages.
First Chinese Office Action for Chinese Patent Application No. 2013082200801190; Dated Aug. 27, 2013; 14 pages.
First Office Action and Search Report with English Translation for Chinese Patent Application No. 201080003456.3; Issue Date Jan. 17, 2013; 15 pages.
GB Appln GB1220971.4 Examination Report Dated May 20, 2014; 5 pages.
GB Exam and Search Report for Application No. GB1314371.4; Dated Nov. 22, 2013; 5 pages.
GB Examination Report dated Mar. 27, 2013 for GB Application No. GB1303390.7; 2 pages.
GB Examination Report dated Aug. 7, 2013 for GB Application No. GB1303390.7; 4 pages.
GB Examination Report dated Aug. 15, 2013 for GB Application No. GB 1303382; 4 pages.
GB Examination Report dated Jan. 15, 2015 for GB Application No. GB1208504.9; 3 pages.
GB Examination Report dated Jun. 19, 2013 for GB Application No. GB1202398.2; 4 pages.
First Chinese Office Action for Chinese Issue Serial No. 2013082200801190; Dated Aug. 27, 2013; 14 pages.
GB Examination Report dated Mar. 27, 2013 for GB Application No. GB1303382.4; 3 pages.
GB Examination Report dated Mar. 27, 2013 for GB Application No. GB1303390.7; 3 pages.
GB Office Action dated Jan. 15, 2014 for SJB/PX210785GB; UK Patent Application No. 1214426.7; 4 pages.
GB Office Action for Application No. GB1303392.3 issued Oct. 1, 2014; 3 pages.
GB Office Action re Application No. GB1118130.2 issued Jul. 22, 2014; 2 pages.
International Search Report for International Application No. PCT/US2011/021273 mailed Jan. 14, 2011; 15 pages.
German Office Action for DE Application Serial No. 102012109481.0; dated Aug. 1, 2013; 12 pages.
German Office Acton for DE Application No. 102013102.554.4; Dated Jan. 9, 2014; 14 pages.
International Report on Preliminary Patentability and Wrtten Opinion for Application No. PCT/EP2009/050887; Date of Issue Sep. 7, 2010; 11 pages.
Germany Office Action for DE Application No. 10 2012 107 544.1; Issued Jan. 2, 2013; 9 pages.
Godin, G., et al., A Method for the Registration of Attributed Range Images, Copyright 2001, [Retrieved on Jan. 18, 2010 at 03:29 from IEEE Xplore]; 9 pages.
Hart, A., "Kinematic Coupling Interchangeability", Precision Engineering, vol. 28, No. 1, Jan. 1, 2004, pp. 1-15, XP55005507, ISSN: 0141-6359, DOI: 10.1016/S0141-6359(03)00071-0.
Horn, B.K.P., Closed-Form Solution of Absolute Orientation Using Unit Quaternions, J. Opt. Soc. Am. A., vol. 4., No. 4, Apr. 1987, pp. 629-642, ISSN 0740-3232.
Howard, et al., "Virtual Environments for Scene of Crime Reconstruction and Analysis", Advanced Interfaces Group, Department of Computer Science, University of Manchester, Manchester, UK, Feb. 28, 2000; 8 pages.
Ingenhand, H., Dr., "Introduction to Geodetic Metrology", "Einfuhrung in die Geodatische Messtechnik", Federal Institute of Technology Zurich, 2004, with English translation; 6 pages.

International Preliminary Report on Patentability for International Application Serial No. PCT/EP2011/003262. International filing date Jul. 1, 2011. Date of Issuance Jan. 29, 2013; 6 pages.
International Search Report for International Patent Application PCT/IB2010/002226; Date of Mailing Dec. 13, 2010; 4 pages.
International Preliminary Report on Patentatibility for PCT/EP2009/050888; Date of Issuance Sep. 7, 2010; 19 pages.
International Preliminary Report on Patentability and Written Opinion; International Application No. PCT/EP2007/005789; International Filing Date: Jun. 29, 2007; Date of Mailing: Jan. 6, 2009; 7 pages.
International Preliminary Report on Patentability and Written Opinion for International Application No. PCT/EP2007/005789; Date of Mailing Oct. 30, 2007; 2 pages.
International Preliminary Report on Patentability for International Application Serial No. PCT/IB2011/003264. International filing date Jul. 1, 2011. Date of Issuance Jan. 29, 2013; 7 pages.
International Preliminary Report on Patentability and Written Opinion for International Patent Application PCT/IB2010/002226; Date of Issuance Jan. 24, 2012; 10 pages.
International Preliminary Report on Patentability re Application No. PCT/EP2012/075178 dated Jul. 29, 2014; 5 pages.
International Preliminary Report on Patentability and Written Opinion for PCT/EP2009/009174; Date of Issuance Aug. 16, 2011; 7 pages.
International Preliminary Report on Patentability for International Application Serial No. PCT/EP2011/003263. International filing date Jul. 1, 2011. Date of Issuance Jan. 29, 2013; 7 pages.
International Preliminary Report on Patentability mailed May 9, 2012 for International Application Serial No. PCT/US2011/021253 International filing date Jan. 14, 2011. Date of Completion May 9, 2012; 32 pages.
International Preliminary Report on Patentability and Written Opinion for PCT/EP2010/001779; Date of Issuance Sep. 27, 2011; 3 pages.
International Preliminary Report on Patentability and Written Opinion for PCT/EP2010/001780; Date of Issuance Sep. 27, 2011; 6 pages.
International Preliminary Report on Patentability and Written Opinion for PCT/EP2010/001781; Date of Issuance Sep. 27, 2011; 8 pages.
International Preliminary Report on Patentability and Written Opinion for PCT/EP2010/006866; Date of Issuance May 22, 2012; 7 pages.
International Preliminary Report on Patentability and Written Opinion for PCT/EP2010/006867; Date of Issuance May 22, 2012; 7 pages.
International Preliminary Report on Patentability for International Application Serial No. PCT/EP2011/003261. International filing dateJul. 1, 2011. Date of Issuance Jan. 29, 2013; 6 pages.
International Preliminary Report on Patentability and Written Opinion for PCT/IB2010/002216; Date of Issuance Jan. 24, 2012; 9 pages.
International Preliminary Report on Patentability; International Application No. WO2009095383; International Filing Date: Jan. 27, 2009; Date of Mailing: Sep. 7, 2010; 11 pages.
International Preliminary Report on Patentability and Written Opinion for PCT/IB2010/002258; Date of Issuance Feb. 21, 2012; 8 pages.
International Preliminary Report on Patentability and Written Opinion of the International Searching Authority; International Application No. PCT/US2013/022186; International Filing Date: Jan. 18, 2013; Date of Mailing: Aug. 26, 2014; 6 pages.
International Search Report and Written Opinion for Application No. PCT/US2012/032970 dated Nov. 28, 2012; 12 pages.
International Search Report and Written Opinion for Application No. PCT/US2012/032972 dated Nov. 28, 2012; 7 pages.
International Search Report and Written Opinion for PCT/EP2009/009174; Date of Mailing May 25, 2010; 7 pages.
International Search Report for International Application No. PCT/2011/021274 filed Jan. 14, 2011; 5 pages.
International Search Report for International Application No. PCT/EP2006/003010 mailed Nov. 12, 2006; 4 pages.

(56) References Cited

OTHER PUBLICATIONS

International Search Report; International Application No. PCT/US2011/020273; International Filing Date: Jan. 5, 2011; Date of Mailing Apr. 20, 2011; 8 pages.
International Search Report for International Application No. PCT/EP2011/020274; International Filing Date Jan. 5, 2011; Date of Mailing: Jul. 6, 2011, 3 pages.
International Search Report: International Application No. PCT/EP2011/020276; Foreign Filing Date: Jan. 5, 2011; Date of Mailing Jun. 6, 2011, 6 pages.
International Search Report for International Patent Application PCT/EP2010/001779; Date of Mailing Jul. 20, 2010, 3 pages.
International Search Report for International Patent Application PCT/EP2010/001780; mailing date Jul. 23, 2010; 3 pages.
International Search Report for International Patent Application PCT/EP2010/006867; mailing date Mar. 18, 2011; 7 pages.
International Search Report and Written Opinion for Application No. PCT/US2012/032970 dated Nov. 28, 2012.
Internatinal Preliminary Report on Patentability and Written Opinion for PCT/IB2010/002216; International Filing Date: Jul. 20, 2010; Date of Issuance Jan. 24, 2012; 9 pages.
International Preliminary Report on Patentability and Written Opinion of the International Searching Authority; International Application No. PCT/US2013/022186; International Filing Date: Jan. 18, 2013; Date of Mailing: Sep. 4, 2014; 7 pages.
International Search Report and Written Opinion for Application No. PCT/US2012/032970; International Filing Date: Apr. 11, 2012; Dated Nov. 28, 2012; 19 pages.
International Search Report and Written Opinion for PCT/EP2009/009174; International Filing Date: Dec. 19, 2009; Date of Mailing May 25, 2010; 7 pages.
International Search Report for International Application No. PCT/EP2006/003010; Mailed Nov. 12, 2006; 4 pages.
International Search Report; International Application No. PCT/US2011/020270; International Filing Date: Jan. 5, 2011; Date of Mailing Apr. 4, 2011; 2 pages.
J.Geng "Structured-Light 3D Surface Imaging: A Tutorial," Advances in Optics and Photonics 3; Mar. 31, 2011, pp. 128-160; IEEE Intelligent Transportation System Society; 2011 Optical Society of America.
Japanese Office Action; Japanese Application No. 2012-550051; Date of Mailing: Aug. 5, 2014; 4 pages.
International Search Report for International Application No. PCT/US2011/050787; International Filing Date Sep. 8, 2011; Mailing date Nov. 3, 2011; 5 pages.
International Search Report for International Application No. PCT2011/021274; International Filing Date Jan. 14, 2011, Date of Mailing May 6, 2011; 10 pages.
International Search Report for International Patent Application PCT/EP2010/001779; International Filing Date Mar. 22, 2010; Date of Mailing Jul. 20, 2010; 10 pages.
International Search Report for International Patent Application PCT/EP2010/001780; International Filing Date Mar. 22, 2010; Mailing date Jul. 23, 2010; 9 pages.
International Search Report for International Patent Application PCT/EP2010/001781; International Filing Date Mar. 22, 2010; Mailing date Jul. 22, 2010; 11 pages.
International Search Report for International Patent Application PCT/EP2010/006867; International Filing Date Nov. 11, 2010; mailing date Mar. 18, 2011; 10 pages.
International Search Report for International Patent Application PCT/IB2010/002226; Date of Mailing Dec. 13, 2010.
International Search Report for International Patent Application PCT/IB2010/002258; Date of Mailing Jan. 28, 2011.
Japanese Office Action; Application. No. 2012-501176; Date of Mailing: Aug. 12, 2014; 5 pages.
iQsun Laserscanner Brochure, 2 Pages, Apr. 2005.
International Search Report for PCT/EP2009/009174 and Written Opinion of the International Searching Authority; International Filing Date Dec. 19, 2009; Mailing date May 25, 2010; 7 pages.
Japanese Office Action; Japanese Serial No. 2012-550055; Date of Mailing: Jul. 15, 2014; 4 pages.
International Search report of the International Application No. PCT/IB2013/003082; International Filing Date Sep. 27, 2013; Mailed Apr. 28, 2014; 5 pages.
Japanese Office Action; Japanese Application Serial No. 2012-550054: Date of Mailing: Aug. 5, 2014; 3 pages.
International Search Report of the International Searching Authority for PCT/EP2010/001781; International Filing Date Mar. 22, 2010; Date of Mailing Jul. 22, 2010, 11 pages.
Japanese Office Action; Japanese Application Serial No. 2012-534590; Date of Mailing: Sep. 2, 2014, 4 pages.
International Search Report of the International Searching Authority for Application No. PCT/EP2009/050888; Date of Mailing Sep. 15, 2009.
International Search Report of the International Searching Authority for Application No. PCT/EP2011/001662; Date of Mailing May 26, 2011.
International Search Report of the International Searching Authority for Application No. PCT/EP2011/003261; International Filing Date Jul. 1, 2011; Date of Mailing Oct. 17, 2011; 4 pages.
International Search Report of the International Searching Authority for Application No. PCT/EP2011/003262; International Filing Date Jul. 1, 2011; Date of Mailing Sep. 30, 2011; 3 pages.
International Search Report of the International Searching Authority for Application No. PCT/EP2011/003263; International Filing Date Jul. 1, 2011; Date of Mailing Oct. 19, 2011; 4 pages.
International Search Report of the International Searching Authority for Application No. PCT/EP2011/003264; International Filing Date Jul. 1, 2011; Date of Mailing Oct. 19, 2011; 4 pages.
International Search Report of the International Searching Authority for Application No. PCT/EP2012/075178; International Filing Date Dec. 12, 2012; Date of Mailing Apr. 9, 2013; 12 pages.
Japanese Office Action; Japanese Patent Application Serial No. 2012-534588; Date of Mailing: Sep. 17, 2013; 8 pages.
Merriam-Webster, [online]; [retrieved Dec. 19, 2012]; retrieved from the internet www.meriam-webster .com/dictionary/parts. m-w.com, "Parts," 6 p.
Japanese Office Action; Japanese Application Serial No. 2012-534590; Date of Mailing Jul. 30, 2013; 3 pages.
International Search Report of the International Searching Authority for PCT/EP2007/005789; Date of Mailing Oct. 30, 2007.
International Search Report of the International Searching Authority for PCT/EP2009/050887; International Filing Date Date of Mailing May 14, 2009; 4 pages.
International Search Report of the International Searching Authority for PCT/EP2009/050888; Date of Mailing Sep. 15, 2009; 4 pages.
International Search Report of the International Searching Authority for PCT/EP2010/001779; Date of Mailing Jul. 20, 2010; 3 pages.
International Search Report of the International Searching Authority for PCT/EP2010/001780; Date of Mailing Jul. 23, 2010; 3 pages.
International Search Report of the International Searching Authority for PCT/EP2010/006866; Date of Mailing Mar. 14, 2011; 3 pages.
International Search Report of the International Searching Authority for PCT/EP2010/006868; Date of Mailing Mar. 14, 2011; 2 pages.
International Search Report of the International Searching Authority for PCT/IB2010/002216; Date of Mailing Feb. 3, 2011; 4 pages.
Jasiobedzki, Piotr, [online]; [retrieved on Oct. 4, 2011]; retrieved from the Internet http://scitation.aip.org/getpdf/servlet/Ge., "Laser Eye—A New 3D Sensor for Active Vision," SPIE—Sensor Fusion VI, vol. 2059, Sep. 7, 1993, XP00262856, Boston, U.S.A.. pp. 316-321.
Japanese Office Action; Japanese Patent Application Serial No. 2012-534589; Date of Mailing: Jul. 30, 2013; 3 pages.
International Search Report of the International Searching Authority forPCT/EP2010/006867; Date of Mailing Mar. 18, 2011; 3 pages.
International Preliminary Report on Patentability; International Application No. PCT/US2013/041826; International Filing Date May 20, 2013; Issued Dec. 9, 2014; 7 pages.
International Preliminary Report on Patentability; International Application No. PCT/US2013/040309; International Filing Date May 9, 2013; Issued Dec. 16, 2014; 8 pages.

(56) References Cited

OTHER PUBLICATIONS

International Preliminary Report on Patentability; International Application No. PCT/US2013/040321; International Filing Date May 9, 2013; Issued Dec. 16, 2014; 7 pages.
International Preliminary Report on Patentability; International Application No. PCT/US2013/049562; International Filing date Jul. 8, 2013; Issued Jan. 20, 2015; 10 pages.
J.Geng "Structured-Light 3D Surface Imaging: A Tutorial" (pub. Mar. 31, 2011) Advances in Optics and Photonics 3, pp. 128-160; IEEE Intelligent Transportation System Society; 2011 Optical Society of America.
Japanese Office Action; Japanese Patent Application No. 2012-550047; Issued Aug. 5, 2014; 3 pages.
Japanese Office Action; Japanese Application Serial No. 2012-550052; Date of Mailing: Jul. 15, 2014; 4 pages.
Japanese Office Action; Japanese Application Serial No. 2013-520987; Date of Mailing Jul. 2, 2013; 4 pages.
Japanese Office Action; Application Serial No. 2013-520989; Date of Mailing Jul. 2, 2013; 3 pages.
Final Office Action; U.S. Appl. No. 13/006,524, filed Jan. 14, 2011; Notification Date: Jul. 31, 2014; 29 pages.
Japanese Office Action; Japanese Patent Application No. 2012501176; Mailing Dated Sep. 3, 2013. 6 pages.
Japanese Office Action; Japanese Patent Application No. 2012-534588; Date of Mailing Sep. 17, 2013; 8 pages.
Japanese Office Action; Japanese Application No. 2013-520988; Date of Mailing: Mar. 4, 2014; 7 pages.
Japanese Office Action; Japanese Application Serial No. 2012-501175; Date of Mailing Jul. 16, 2013; 3 pages.
Japanese Office Action; Japanese Application Serial No. 2013-520990; Mailing Dated Jul. 2, 2013; 3 pages.
Japanese Office Action; Japanese Patent Application Serial No. 2012-501174; Mailing Dated Oct. 29, 2013; 6 pages.
Langford, et al., "Practical Skills in Forensic Science", Pearson Education Limited, Essex, England, First Published 2005, Forensic Chemistry; p. 385.
Leica Geosystems, FBI Crime Scene Case Study, Tony Grissim, Feb. 2006; 11 pages.
Merriam-Webster, [online]; [retrieved Dec. 19, 2012]; retrieved from the internet www.meriam-webster.com/dictionary/interface. m-w.com, "Interface," 3 p.
Merriam-Webster, (m-w.com), [online]; [retrieved Dec. 19, 2012]; retrieved from the internet www.meriam-webster.com/dictionary/traverse. m-w.com, "Traverse," 6 p.
Non-Final Office Action; U.S. Appl. No. 14/257,216, filed Apr. 21, 2014; Date of Notification: Oct. 16, 2014; Date of Notification: Oct. 16, 2014; 72 pages.
Non-Final Office Action; U.S. Appl. No. 13/259,446, filed Dec. 2, 2011; Date of Notification: Oct. 3, 2014; 23 pages.
Non-Final Office Action; U.S. Appl. No. 12/812,235, filed Apr. 5, 2013; Date of Notification: Dec. 29, 2014; 162 pages.
Non-Final Office Action; U.S. Appl. No. 13/697,031, filed Apr. 29, 2013; Date of Notification Mar. 6, 2015;93 pages.
Non-Final Office Action, U.S. Appl. No. 14/549,851, filed Nov. 21, 2014; Date of Notification: Mar. 23, 2015; 29 pages.
Notice of Allowance; U.S. Appl. No. 12/257,216, filed Apr. 21, 2014; Date of Notification Dec. 2, 2014; 9 pages.
Notice of Allowance; U.S. Appl. No. 14/548,528, filed Nov. 20, 2014; Date of Mailing: Feb. 20, 2015; 51 pages.
Office Action; United Kingdom Application No. GB1418273.7; Dated Oct. 24, 2014; 8 pages.
Office Action; Chinese Patent Application No. 201180005129.6; Mailing Dated Mar. 28, 2014; 310 pages.
Office Action; German Patent Application No. 11 2011 100 292.0; Filing Date: Jan. 14, 2011; Date of Mailing: Jan. 12, 2015; 10 pages.
Office Action; German Patent Application No. 11 2011 100 310.2; Filing Date: Jan. 20, 2011; Date of Mailing: Jan. 12, 2015; 15 pages.
Office Action; German Patent Application No. 11 2011 100 193.2; Filing Date: Jan. 14, 2011; Date of Mailing: Jan. 13, 2015; 10 pages.

Office Action; United Kingdom Application No. 1422105.5; Date of Mailing: Jan. 26, 2015;, 1 page.
Office Action; Japanese Application No. 2013-549396; Date of Mailing: Feb. 3, 2015; 6 pages.
Office Action; Chinese Application No. 201180005129.6; Issue Serial No. 2015020501009030; Date of Issue: Feb. 10, 2015; 7 pages.
Office Action; Chinese Application No. 201380005188.2; Issue Serial No. 2015022701094080; Date of Issue: Mar. 3, 2015; 14 pages.
Office Action; Chinese Application No. 201180004747.9; Date of Notification: Mar. 13, 2015; 8 pages.
Office Action; GB1208504.9; Date of Report: Jan. 15, 2015; 3 pages.
Office Action; German Patent Application No. 11 2011 104 712.6; Filing Date: Jan. 14, 2011; Mailing Date: Dec. 18, 2014; 12 pages.
Office Action; Chinese Patent Application No. 201180006726.0; Mailing Date: Nov. 15, 2014; 7 pages.
Office Action; Chinese Application No. 2011800065061.0; Date of Notification Nov. 27, 2014; 16 pages.
Office Action; Chinese Patent No. 201180004888.0; Mailing Date: Dec. 2, 2014; 19 pages.
Office Action; United Kingdom Patent Application No. GB1210423.8; Mailing Date: Feb. 18, 2014; 3 pages.
International Search Report; International Application No. PCT/2011/020625; International Filing Date: Jan. 10, 2011; Mailing Dated Feb. 25, 2011; 5 pages.
International Search Report; International Application No. PCT/US2011/021270; International Filing Date: Jan. 14, 2011; Date of Mailing: May 2, 2011; 4 pages.
Provision of the minutes in accordance with Rule 124(4) EPC dated Aug. 14, 2013, filed in Opposition re Application No. 07 785 873.6/Patent No. 2 062 069, Proprietor: Faro Technologies, Inc., filed by Leica Geosystem AG on Feb. 5, 2013.; 10 pages.
R.W. Boyd, Radiometry and the Detection of Optical Radiation, John Wiley & Sons; 1993, pp. 20-23.
Se, et al., "Instant Scene Modeler for Crime Scene Reconstruction", MDA, Space Missions, Ontario, Canada, Copyright 2005, IEEE., 8 pages.
Second German Office Action for German Patent Application Serial No. 10 2009 015 922.3; Mailing Dated Dec. 2, 2013; 7 pages.
Second Japanese Office Action; Japanese Patent Application Serial No. 2012-534590; Date of Mailing Nov. 12, 2013; 6 pages.
Second Office Action with English Translation; Chinese Patent Application No. 201080003466.7; Issue Serial No. 2013071601051530; Issue Date Jul. 19, 2013; 10 pages.
Surman et al. "An autonomous mobile robot with a 3D laser range finder for 3D exploration and digitalization of indoor enviornments." Robotics and Autonomous Systems vol. 45 No. 3-4, Dec. 31, 2003, pp. 181-198. Amsterdamn, Netherlands.
Journal of the Association for Crime Scene Reconstruction, "The Scene," Journal of the Association for Crime Scene Construction; Apr.-Jun. 2006, pp. 1-32, vol. 12, Issue 2.
Non-Final Office Action; U.S. Appl. No. 13/006,455, filed Jan. 14, 2011; Date Mailed: Jun. 19, 2014; 23 pages.
Non-Final Office Action: U.S. Appl. No. 13/006,461, filed Jan. 14, 2011; Date Mailed Apr. 10, 2014; 22 pages.
Non-Final Office Action; U.S. Appl. No. 13/006,524, filed Jan. 14, 2011, Date Mailed: Oct. 3, 2014; 26 pages.
Umeda, K., et al., [on-line]; [retrieved Jan. 28, 2010]; retrieved from the internet "Registration of Range and Color Images Using Gradient Constraints and Ran Intensity Images," Proceedings of the 17th International Conference on Patern Recognition (ICPR'04), Copyright 2010 IEEE, 5 p.
Williams, J.A., et al., [on-line] [Retrieved on Jan. 18, 2010 at 04:10]; retrieved from the internet IEEE Xplore, "Evaluation of a Novel Multiple Point Set Registration Algorithm," Copyright 2000; 5 pages.
Willoughby, P., "Elastically Averaged Precisoin Alignment", In: "Doctoral Thesis", Jun. 1, 2005, Massachusetts Institute of Technology, XP55005620, abstract 1.1 Motivation, Chapter 3, Chapter 6; 158 pages.
Written Opinion; International Application No. PCT2011/021274; International Filing Date: Jan. 14, 2011; Date of Mailing: Nov. 28, 2013; 10 pages.

(56) References Cited

OTHER PUBLICATIONS

Written Opinion; International Application No. WO2009095383; International Filing Date: Jan. 10, 2011; Date of Mailing: Feb. 25, 2011; 5 pages.
Written Opinion of the International Searching Authority; International Patent Application PCT/EP2009/050888; International Filing Date: Jan. 27, 2009; Date of Mailing Sep. 15, 2009; 19 pages.
Written Opinion of the International Searching Authority; International Application No. for PCT/2011/020625; International Filing Date: Jan. 10, 2011; Date of Mailing: Feb. 25, 2011; 5 pages.
Written Opinion of the International Searching Authority; International Application No. PCT/EP2006/003010; International Filing Date: Apr. 3, 2006; Date of Mailing Dec. 11, 2006; 10 pages.
Written Opinion of the International Searching Authority; International Application No. PCT/EP2011/001662; International Filing Date: Apr. 1, 2011; Date of Mailing May 26, 2011; 10 pages.
Written Opinion of the International Searching Authority; for Application No. PCT/EP2012/075178; International Filing Date: Dec. 12, 2012; Date of Mailing Apr. 9, 2013; 5 pages.
Written Opinion of the International Searching Authority; International Application No. PCT/IB2013/003082; International Filing Date: Sep. 27, 2013; Date of Mailing: Apr. 28, 2014; 12 pages.
Written Opinion of the International Searching Authority; International Application No. PCT/US2013/049562; International Filing Date: Jul. 8, 2010; Date of Mailing: Nov. 28, 2013, 17 pages.
Written Opinion of the International Searching Authority; International Patent Application PCT/US2011/050787; International Filing Date: Sep. 8, 2011; Date of Mailing: Nov. 3, 2011; 12 pages.
Written Opinion of the International Searching Authority; International Application No. PCT/US2011/021270; International Filing Date: Jan. 14, 2011; Date of Mailing: May 2, 2011; 13 pages.
Written Opinion of the International Searching Authority; International Application No. PCT/US2011/021276; International Filing Date: Jan. 14, 2011; Date of Mailing: May 6, 2011; 5 pages.
Written Opinion of the International Searching Authority; International Application No. PCT/US2011/050787; International Filing Date: Sep. 8, 2011; Date of Mailing: Nov. 3, 2011; 12 pages.
Written Opinion of the International Searching Authority; International Patent Application PCT/EP2010/006867; International Filing Date: Nov. 11, 2010; Mailing Date: Mar. 18, 2011; 9 pages.
Chinese Office Action to Application No. 20118004746.4, Issued Apr. 21, 2015, 3 pages.
Davidson, A. et al., "MonoSLAM: Real-Time Single Camera SLAM", IEEE Transactions on Pattern Analysis and Machine Intelligence, vol. 29, No. 6, Jun. 1, 2007, pp. 1052-1067, XP011179664.
Examination Report for Application No. GB1416704.3 dated Mar. 30, 2015; 3 pages.
Examination Report for DE 11 2011 102 995.0 dated May 5, 2015; 4 pages.
Examination Report for GB1504825.9 dated May 28, 2015; Received Jun. 30, 2015; 6 pages.
Final Office Action for U.S. Appl. No. 13/812,235 dated May 14, 2015, pp. 1-18.
Foreign Office Action for Japanese Patent Appliation No. 2015-516035 filed May 20, 2013, Base on International application No. PCT/US2013/041826, Dated May 12, 2015, Mailed Jun. 3, 2015; pp. 1-3.
Foreign Office Action for JP Patent Appliation No. 2012-550052 filed Jan. 14, 2011, Base on International application No. PCT/US2011/021273, Dated May 12, 2015, pp. 1-4.
Gebre, Biruk A., et al., "Remotely Operated and Autonomous Mapping System (ROAMS)", Technologies for Practical Robot Applications, TEPRA 2009, IEEE International Conference on Nov. 9, 2009, pp. 173-178, XP031570394.
Harrison A. et al., "High Quality 3D Laser Ranging Under General Vehicle Motion", 2008 IEEE International Conference on Robotics and Automation, May 19-23, 2008, pp. 7-12, XP031340123.
International Preliminary Report on Patentability for International Application No. PCT/IB2013/003082; Date of Issuance Apr. 7, 2015; pp. 1-8.
International Search Report and Written Opinion for Application No. PCT/US20141069180 dated Jul. 14, 2015; 13 pages.
International Search Report and Written Opinion for Application No. PCT/US20141069184 dated Jul. 14, 2015; 13 pages.
International Search Report and Written Opinion for Application No. PCT/US2014/069185 dated Jul. 14, 2015; 13 pages.
International Search Report and Written Opinion for Application No. PCT/US2014069181, dated Jul. 14, 2015; 13 pages.
Japanese Office Action for Application No. 2015-049378, Issued May 8, 2015, 3 pages.
May, S. et al, "Robust 3D-Mapping with Time-of-Flight Cameras", Intelligent Robots and Systems, IROS 2009, IEEE/ RSJ International Conference on Oct. 10, 2009, pp. 1673-1678, XP031581042.
Non-Final Office Action for U.S. Appl. No. 14/257,214 dated Jul. 10, 2015; 151 pages.
Notification of Transmittal of the International Search Report and the Written Opinion of the International Searching Authority; PCT/US2015/015737; European Patent Office; Mailed May 8, 2015; 10 pages.
Notification of Transmittal of the International Search Report and the Written Opinion of the International Searching Authority; PCT/US2015/025628; European Patent Office; Dated Jun. 16, 2015; 11 pages.
Office Action for Chinese Patent Application No. 201180004888.0 dated Jul. 7, 2015; Received Jul. 17, 2015; 2 pages.
Office Action for Japanese Patent Application No. 2012-550047 dated May 19, 2015; Received Jun. 15, 2015; 3 pages.
Ohno, K. et al., "Real-Time Robot Trajectory Estimation and 3D Map Construction Using 3D Camera", Intelligent Robots and Systems, 2006 IEEE/RSJ International Conference on Oct. 1, 2006, pp. 5279-5285, XP031006974.
Surmann, H. et al., "An Autonomous Mobile Robot with a 3D Laser Range Finder for 3D Exploration and Digitalization of Indoor Environments", Robotics and Autonomous Systems, Elsevier Science Publishers, vol. 45, No. 3-4, Dec. 31, 2003, pp. 181-198.
Yan, R., et al, "3D Point Cloud Map Construction Based on Line Segments with Two Mutually Perpendicular Laser Sensors", 2013 13th International Conference on Control, Automation and Systems (ICCAS 2013), IEEE, Oct. 20, 2013, pp. 1114-1116.
Ye, C. et al., "Characterization of a 2-D Laser Scanner for Mobile Robot Obstacle Negotiation" Proceedings / 2002 IEEE International Conference on Robotics and Automation, May 11-15, 2002, Washington, D.C., May 1, 2002, pp. 2512-2518, XP009169742.

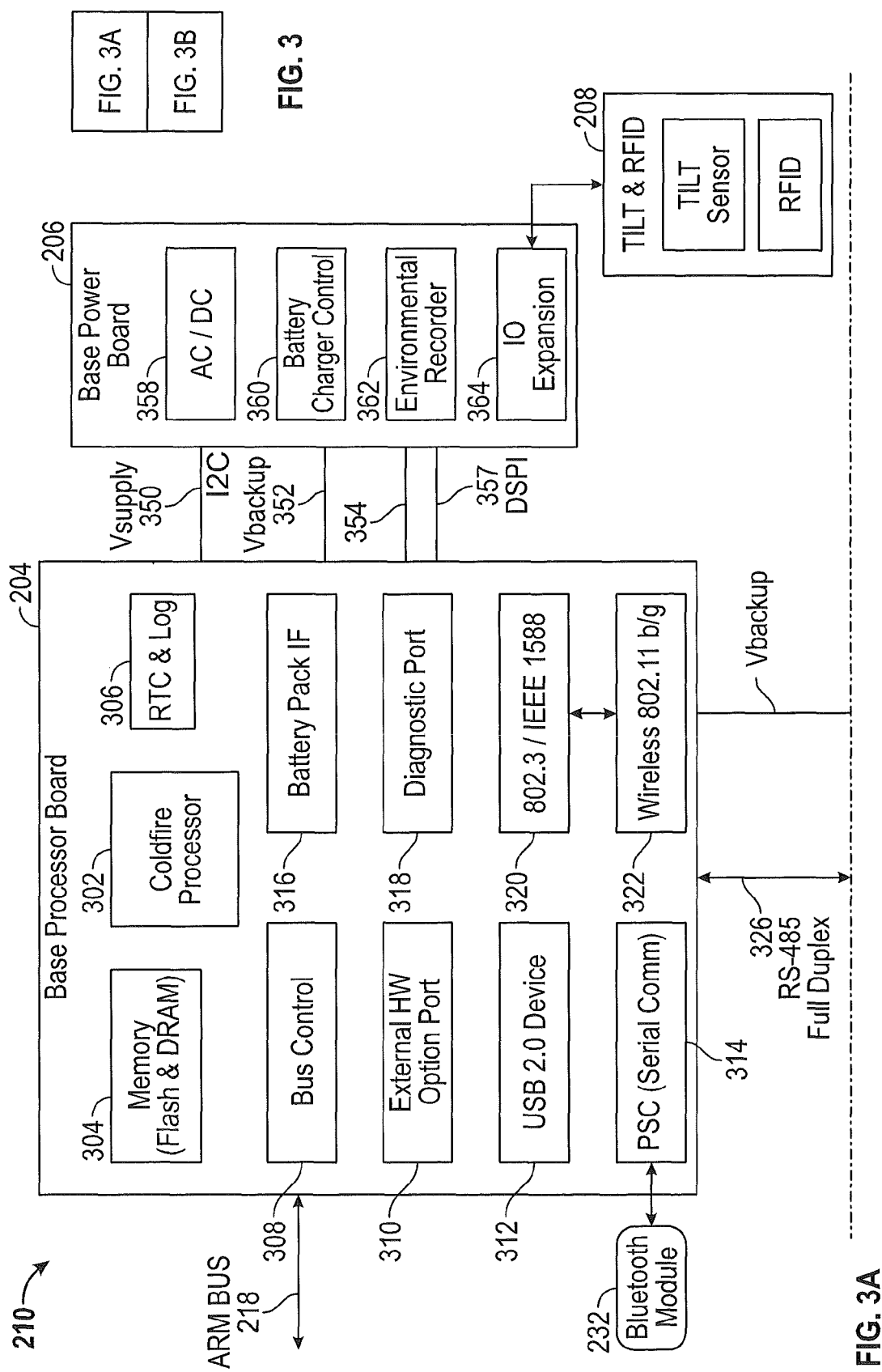

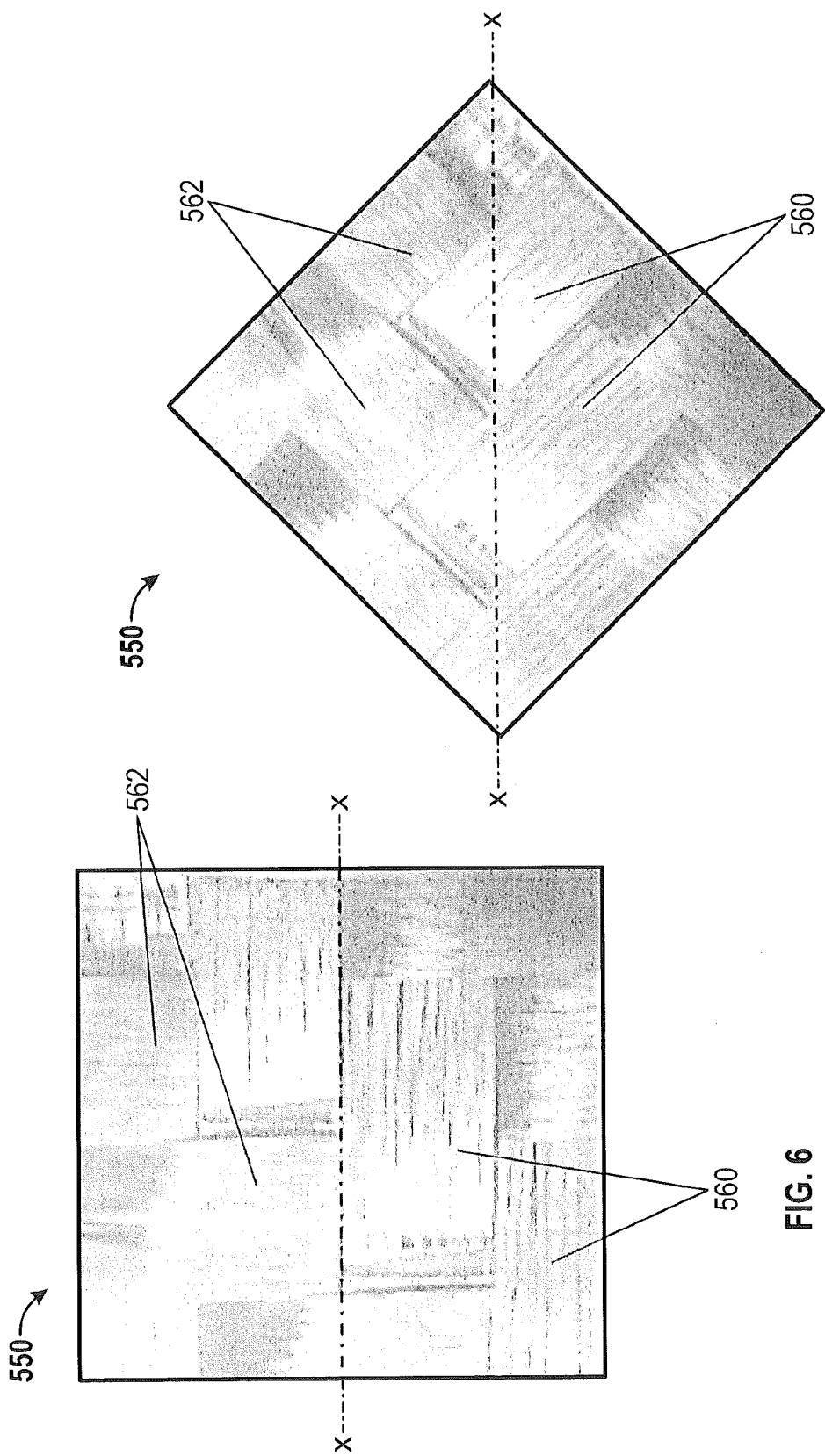

COORDINATE MEASURING MACHINES WITH DUAL LAYER ARM

CROSS REFERENCE TO RELATED APPLICATIONS

This application claims priority to U.S. Design Application No. 29/412,903, filed Feb. 9, 2012 and U.S. Design Application No. 29/379,170, filed Nov. 16, 2010 the entire contents of each of which are incorporated herein by reference.

BACKGROUND

The present disclosure relates to a coordinate measuring machine and, more particularly, to an arm of a portable articulated coordinate measuring machine.

Portable articulated arm coordinate measuring machines (AACMMs) have found widespread use in the manufacturing or production of parts where there is a need to rapidly and accurately verify the dimensions of the part during various stages of the manufacturing (e.g. machining) or production of the part. Portable AACMMs represent a vast improvement over known stationary or fixed, cost-intensive, and relatively difficult to use measurement installations, particularly in the amount of time it takes to perform dimensional measurements of relatively complex parts. Typically a user of a portable AACMM simply guides a probe along the surface of the part or object to be measured. The measurement data are then recorded and provided to the user. In some cases, the data are provided to the user in visual form, for example, three dimensional (3-D) form on a computer screen. Alternatively, the data may be provided to the user in numeric form, for example, when measuring the diameter of a hole, the text "Diameter=" is displayed on a computer screen.

Arm portions of AACMMs may be susceptible to twist due to temperature changes. Twisting of a portion of an arm segment may cause a coupled encoder to rotate, thereby generating an angle error and reducing the accuracy of the machine. Such a twisting may be caused for example by a patterned composite material on an outer region of the arm segment, the outer region having a non-uniform pattern. In general, such twisting effects cannot be removed by measuring temperatures, especially since temperature sensors are ordinarily located in the interior of the arm segments. A method is needed to minimize twisting of the arm segments.

SUMMARY

According to one embodiment of the invention, a portable articulated arm coordinate measuring machine (AACMM) is provided including a manually positionable articulated arm having opposed first and second ends. The arm includes a plurality of connected arm segments. Each arm segment has a longitudinal axis. Each arm segment includes a generally tubular core, an outer sleeve surrounding at least a portion of a length of the core, and at least one position transducer for producing a position signal. The outer sleeve is a cylindrical tube having a first portion at a first end and a second portion that extends from the first portion to an opposite end. The first portion is coupled to an end of the core. The first portion is shorter than the second portion and the second portion is configured to move relative to the core. The portable AACMM also includes a measurement device attached to a first end. An electronic circuit receives the position signal from the at least one transducer and provides data corresponding to a position of the measurement device.

According to another embodiment of the invention, a portable AACMM is provided including a manually positionable articulated arm having opposed first and second ends. The arm includes a plurality of connected arm segments. Each arm segment has a longitudinal axis and includes a core surrounded by an outer material and at least one position transducer for producing a position signal. The outer material includes a plurality of first fibers arranged orthogonally to a plurality of second fibers. The plurality of first fibers and the plurality of second fibers are oriented relative to a longitudinal axis of the arm segment. The AACMM also includes a measurement device attached to a first end of the AACMM and an electronic circuit. The electronic circuit receives a position signal from the at least one position transducer and provides data corresponding to a position of the measurement device.

According to another embodiment of the invention, a method is provided for forming an arm segment for a portable AACMM including forming a generally hollow cylindrical core having a longitudinal axis from a first material. The first material includes a plurality of first fibers arranged orthogonally to a plurality of second fibers. A tubular sleeve is formed from a second material. The second material includes a plurality of third fibers arranged orthogonally to a plurality of fourth fibers. The plurality of third fibers and the plurality of fourth fibers are in a desired orientation relative to the axis. The core is inserted into the sleeve and a first end of the sleeve is fastened to a first end of the core.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIG. 1, including

FIG. 6 is a perspective view of a portion of an arm segment according to an embodiment of the invention;

FIG. 7 is a perspective view of a portion of an arm segment according to an embodiment of the invention.

DETAILED DESCRIPTION

Figure 1A:
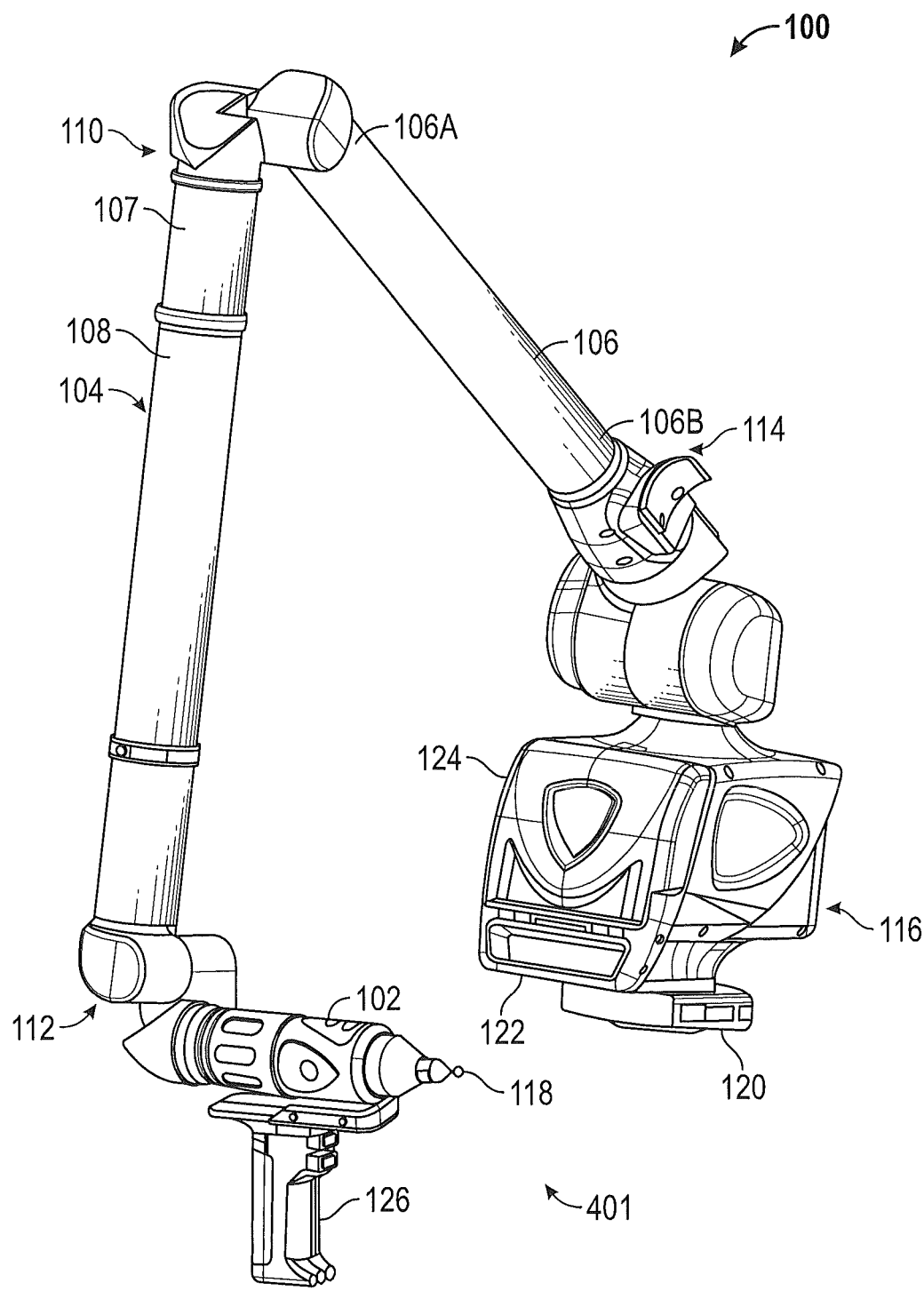
FIGS. 1A and 1B, are perspective views of a portable articulated arm coordinate measuring machine (AACMM) having embodiments of various aspects of the present invention therewithin.
Figure 1B:
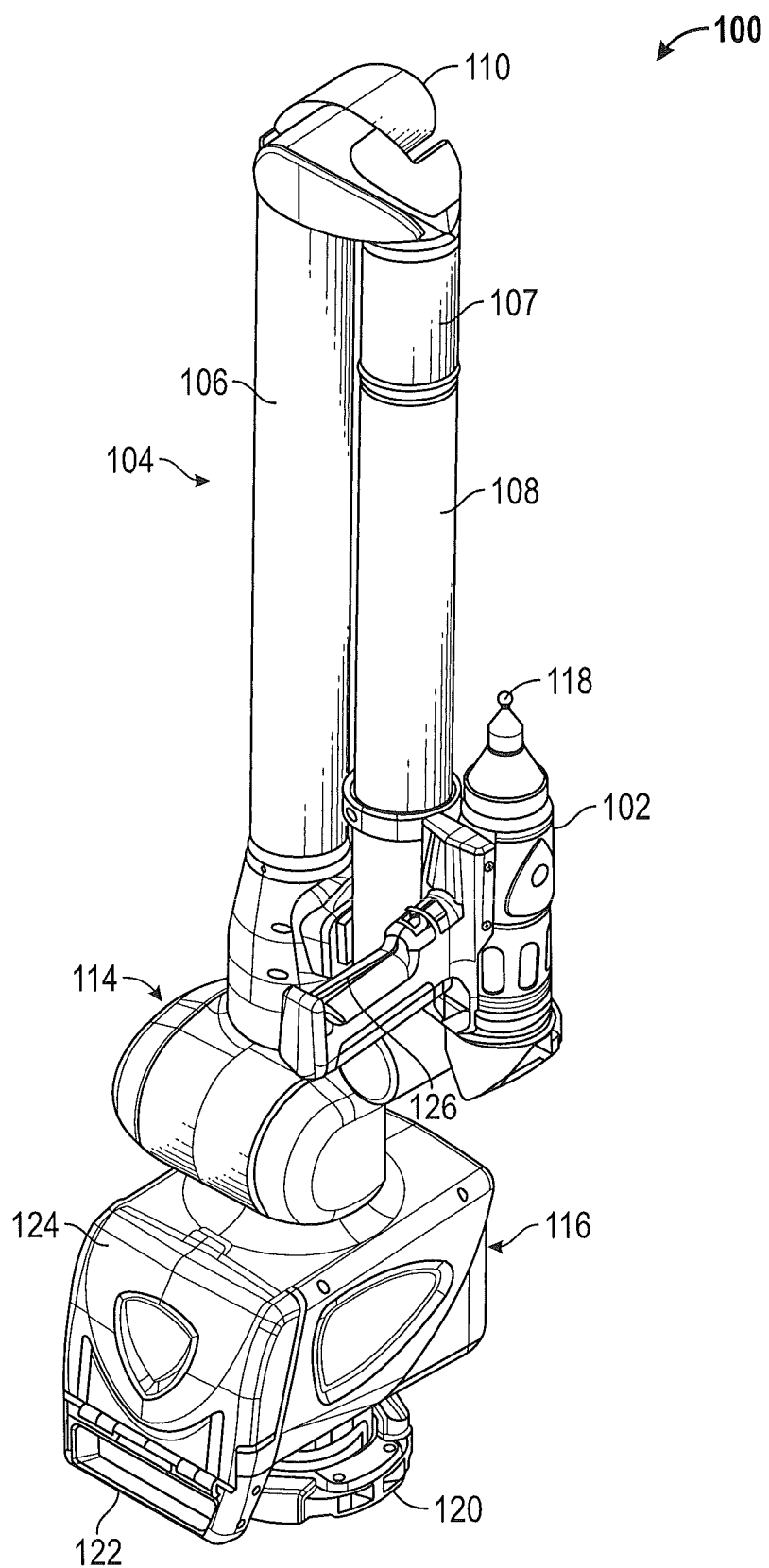

FIGS. 1A and 1B illustrate, an exemplary portable articulated arm coordinate measuring machine (AACMM) according to various embodiments of the present invention, and articulated arm being one type of coordinate measuring machine. AACMMs are used in a variety of applications to obtain measurements of objects. The AACMM 100 may include a six or seven axis articulated measurement device having a probe end 401 that includes a measurement probe housing 102 coupled to an arm portion 104 of the AACMM 100 at one end. The arm portion 104 comprises a first arm segment 106 coupled at a first end 106*a* to a second arm segment 108 by a first grouping of bearing cartridges 110 (e.g. two bearing cartridges). A second grouping of bearing cartridges 112 (e.g. two bearing cartridges) couples the second arm segment 108 to the measurement probe housing 102. A third grouping of bearing cartridges 114 (e.g. three bearing cartridge) couples the second end 106*b* of the first arm segment 106 to a base 116. A bearing cartridge, as used herein, allows a component coupled to the bearing cartridge to move independently about an axis. When combined into a group 110, 112, 114, the bearing cartridges may form a hinge and swivel type of connector such that an adjoining component is independently movable about two axes. It should be appreciated that bearing cartridges may be grouped together in different configurations to a form a connector movable about a single axis or a plurality of axes. The measurement probe housing 102 may comprise the shaft of an additional axis of the AACMM 100 (e.g. a cartridge containing an encoder system that determines movement of the measurement device, for example a probe 118, of the AACMM 100.) In this embodiment, the probe end 401 may rotate about an axis extending through the center of measurement probe housing 102. In use of the AACMM 100, the base 116 is typically affixed to a planar work surface.

Each bearing cartridge within each bearing cartridge grouping 110, 112, 114 typically contains an encoder system (e.g. an optical angular encoder system). The encoder system provides an indication of the position of the respective arm segments 106, 108 and the corresponding bearing cartridge groupings 110, 112, 114 that together provide an indication of the position of the probe 118 with respect to the base 116. A portable AACMM having multiple axes of articulated movement, such as six or seven for example, provides advantages in allowing the operator to position the probe 118 in a desired location within a 360 degree area about the base, while providing an arm portion 104 that may be easily maneuvered by an operator. It should be appreciated that the illustrated arm portion 104 having a first arm segment 106 coupled to a second arm segment 108 is for illustrative purposes only and the claimed invention should not be so limited. An AACMM 100 according to the invention may include any number of arm segments coupled together by bearing cartridges, and thus, more or less than six or seven axes of articulated movement or degrees of freedom.

The probe 118 is detachably mounted to the measurement probe housing 102, which is connected to the bearing cartridge grouping 112. A handle 126 is removable with respect to the measurement probe housing 102 by way of, for example, a quick connect interface. The handle 126 may be replaced with another device (e.g. a laser line probe, a bar code reader, etc. . . . ), thereby providing advantages in allowing the operator to use different measurement devices with the same AACMM 100. In one embodiment, the probe housing 102 houses a removable probe 118, which is a contact measurement device and may have any number of different tips that physically contact the object to be measured, including, but not limited to, ball, touch-sensitive, curved, and extension type probes. In other embodiments, the measurement is performed, for example, by a non-contacting device such as a laser line probe (LLP). The handle 126 may be replaced with the LLP using a quick-connect interface. Other types of measurement devices may replace the removable handle 126 to provide additional functionality. Examples of such measurement devices include, but are not limited to, one or more illumination lights, a bar code scanner, a projector, a paint sprayer, or a camera.

As shown in FIGS. 1A and 1B the AACMM 100 includes the removable handle that provides advantages in allowing accessories or functionality to be changed without removing the measurement probe housing 102 from the bearing cartridge grouping 112. As discussed in more detail below, with respect to FIG. 2, the removable handle may also include an electrical connector that allows electrical power and data to be exchanged with the handle and the corresponding electronics located in the probe end 401.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen for example.

In accordance with an embodiment, the base 116 of the portable AACMM 100 contains or houses an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

Figure 2:
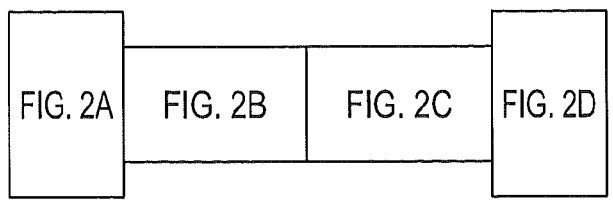
FIG. 2, including FIGS. 2A-2D taken together, is a block diagram of electronics utilized as part of the AACMM of FIG. 1 in accordance with an embodiment of the present invention.

FIG. 2 is a block diagram of electronics utilized in an AACMM 100 in accordance with an embodiment. The embodiment shown in FIG. 2A includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

Figure 2A:
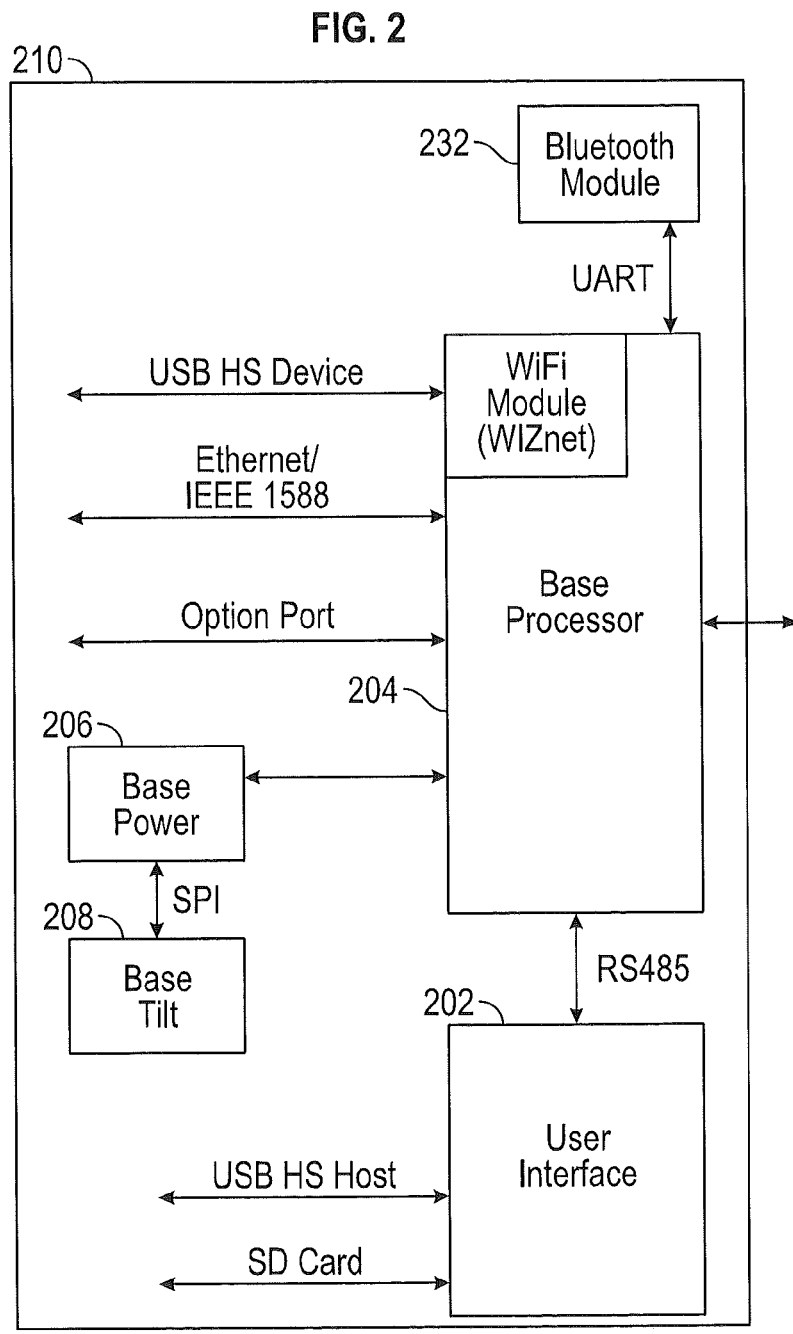
Figure 2B:
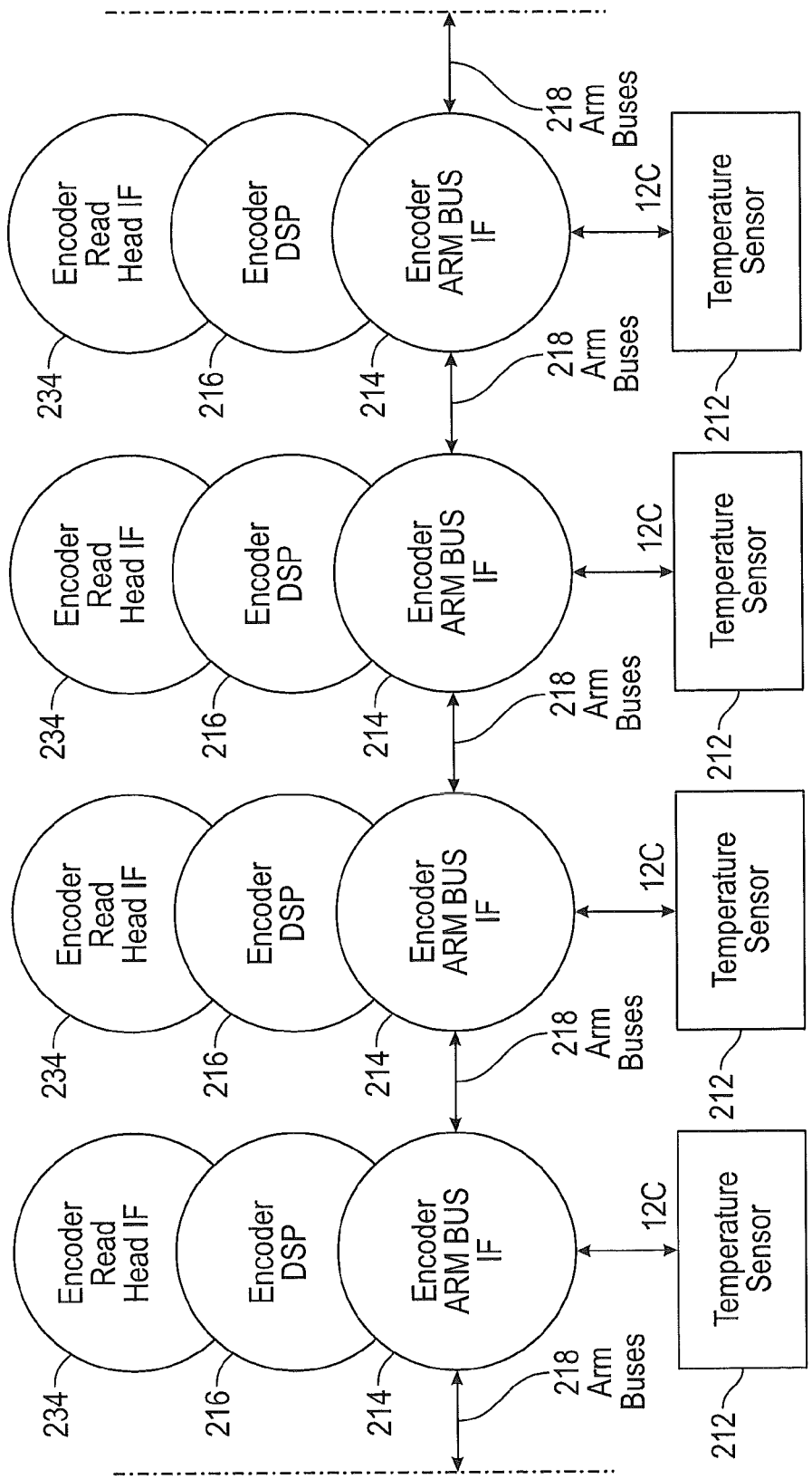
Figure 2C:
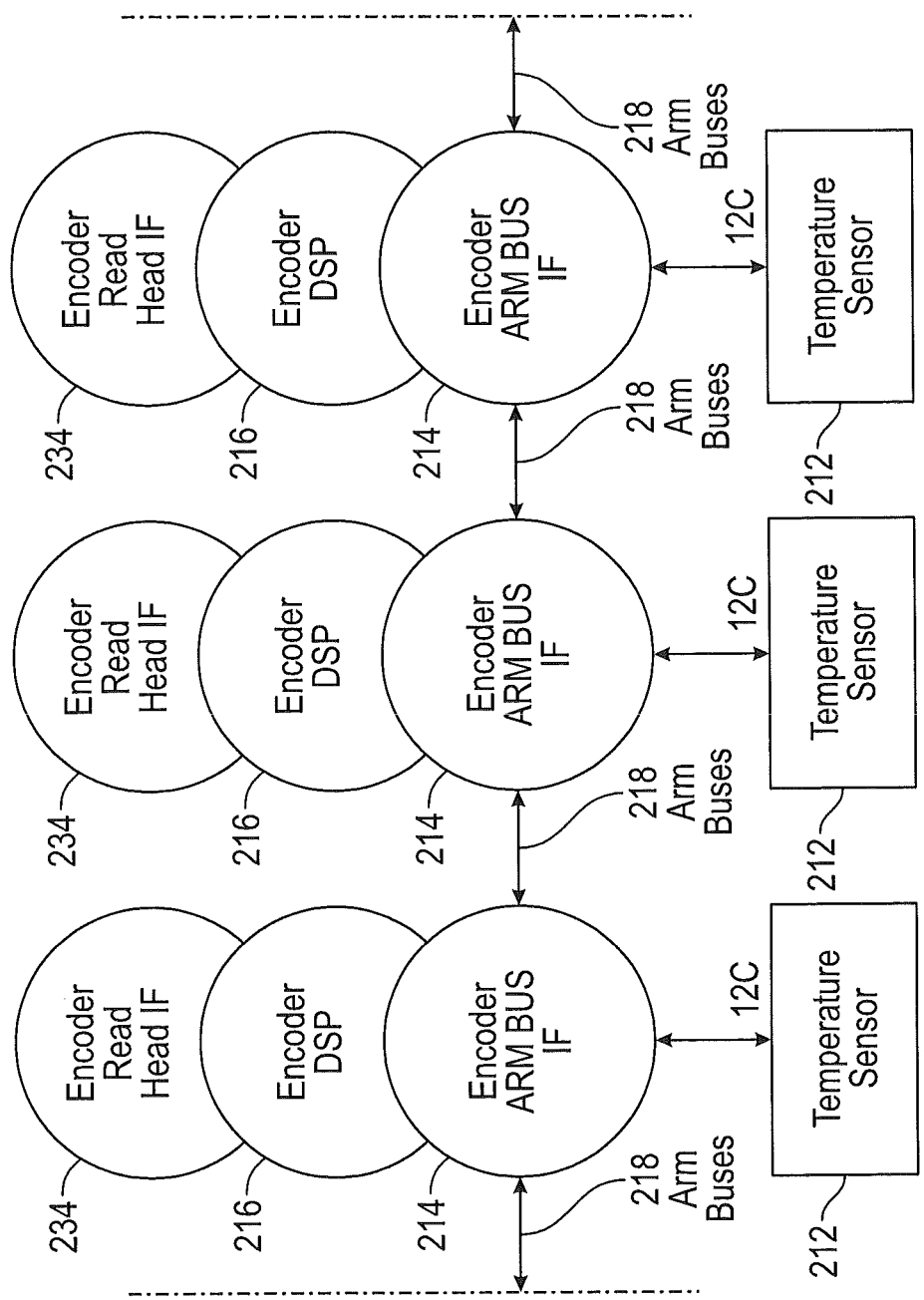

As shown in FIG. 2A, the electronic data processing system 210 is in communication with the aforementioned plurality of encoder systems via one or more arm buses 218. In the embodiment depicted in FIGS. 2B and 2C, each encoder system generates encoder data and includes: an encoder arm bus interface 214, an encoder digital signal processor (DSP) 216, an encoder read head interface 234, and a temperature sensor 212. Other devices, such as strain sensors, may be attached to the arm bus 218.

Figure 2D:
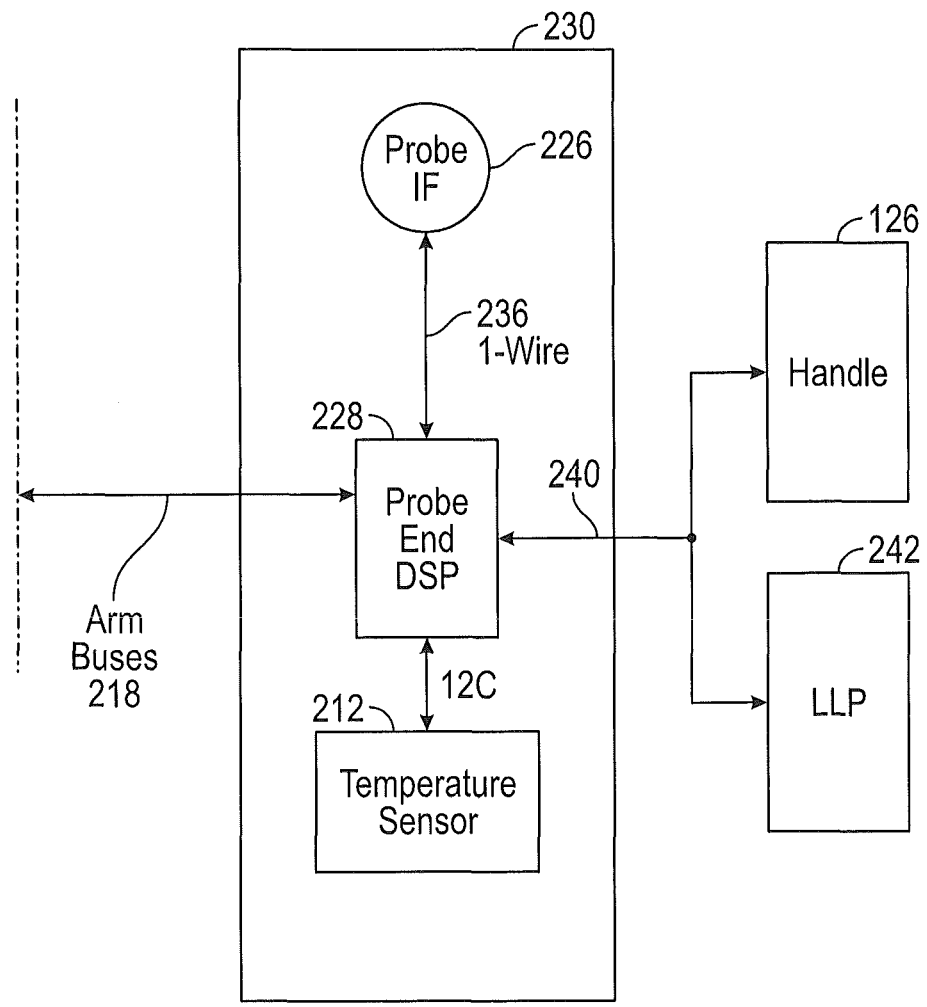

Also shown in FIG. 2D are probe end electronics 230 that are in communication with the arm bus 218. The probe end electronics 230 include a probe end DSP 228, a temperature sensor 212, a handle/LLP interface bus 240 that connects with the handle 126 or the LLP 242 via the quick-connect interface in an embodiment, and a probe interface 226. The quick-connect interface allows access by the handle 126 to the data bus, control lines, and power bus used by the LLP 242 and other accessories. In an embodiment, the probe end electronics 230 are located in the measurement probe housing 102 on the AACMM 100. In an embodiment, the handle 126 may be removed from the quick-connect interface and measurement may be performed by the laser line probe (LLP) 242 communicating with the probe end electronics 230 of the AACMM 100 via the handle/LLP interface bus 240. In an embodiment, the electronic data processing system 210 is located in the base 116 of the AACMM 100, the probe end electronics 230 are located in the measurement probe housing 102 of the AACMM 100, and the encoders are located in the bearing cartridge groupings 110, 112, 114. The probe interface 226 may connect with the probe end DSP 228 by any suitable communications protocol, including commercially-available products from Maxim Integrated Products, Inc. that embody the 1-wire® communications protocol 236.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3A, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as an LLP 242. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers (IEEE) 1588), with a wireless local area network (WLAN) via a LAN function 322, and with Bluetooth module 232 via a parallel to serial communications (PSC) function 314. The base processor board 204 also includes a connection to a universal serial bus (USB) device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface (IF) 326. In an embodiment, the base processor 204 also sends the raw measurement data to an external computer.

Figure 3B:
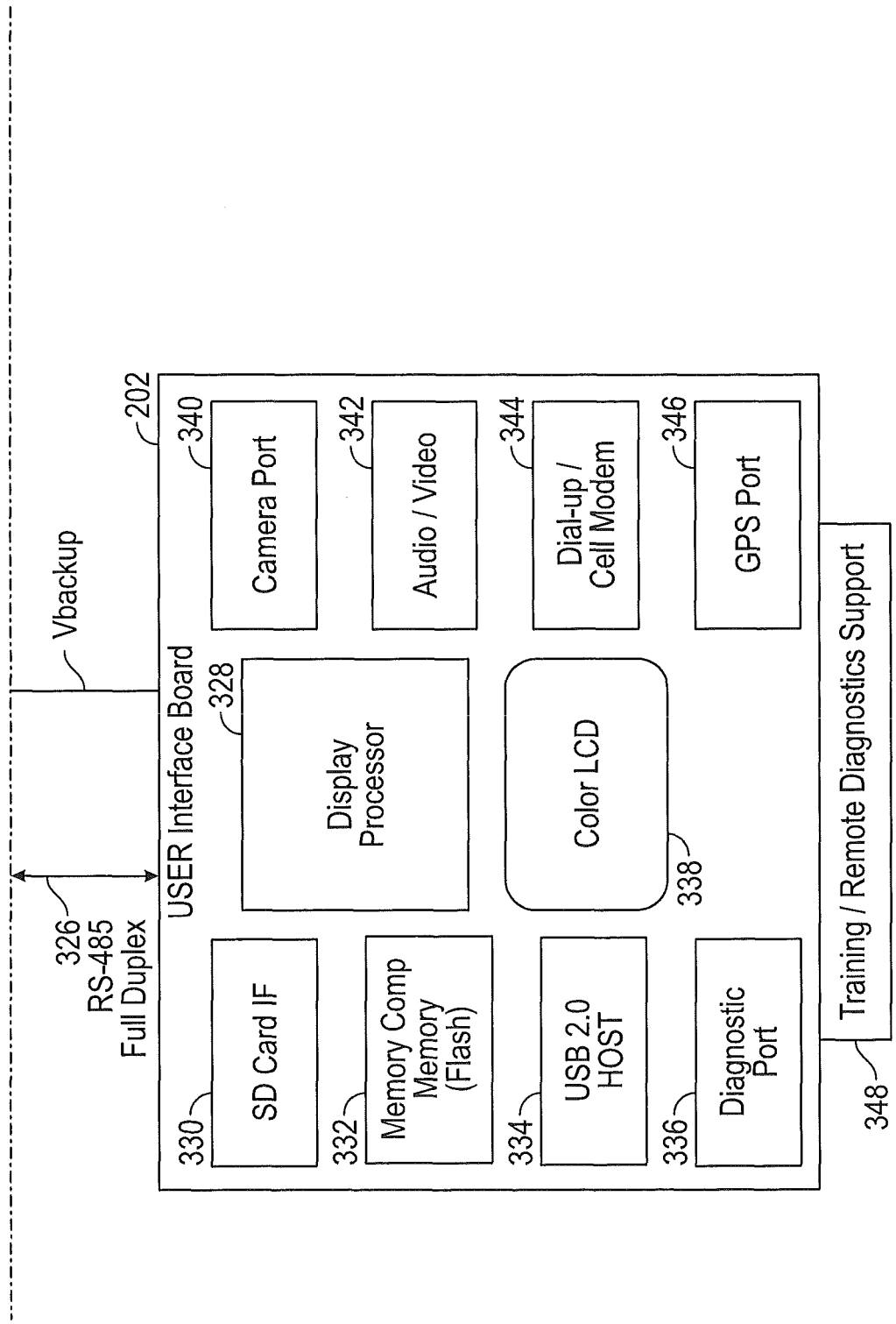
FIG. 3, including FIGS. 3A and 3B taken together, is a block diagram describing detailed features of the electronic data processing system of FIG. 2 in accordance with an embodiment of the present invention.

Turning now to the user interface board 202 in FIG. 3B, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a secure digital (SD) card interface 330, a memory 332, a USB Host interface 334, a diagnostic port 336, a camera port 340, an audio/video interface 342, a dial-up/cell modem 344 and a global positioning system (GPS) port 346.

The electronic data processing system 210 shown in FIG. 3A also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 35. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

Figure 4:
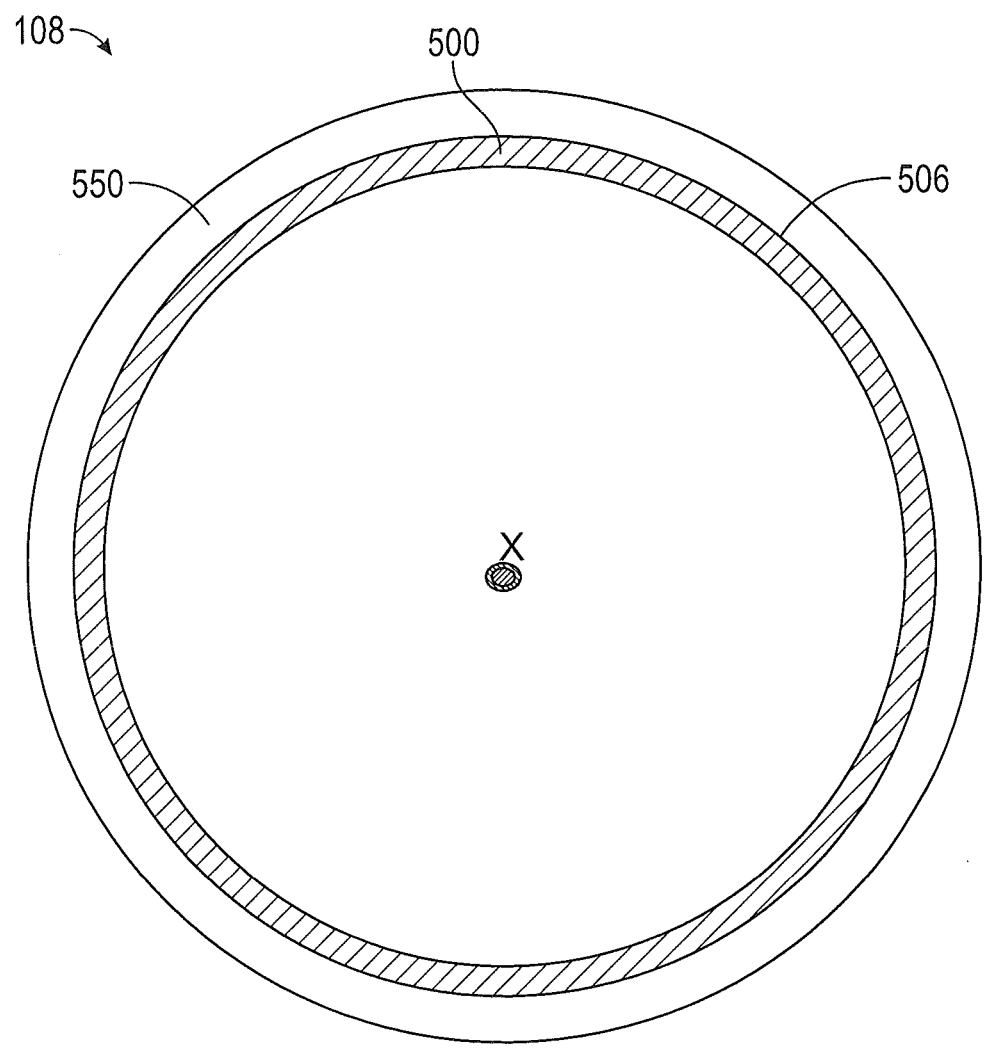
FIG. 4 is a perspective view of an end of an arm segment according to an embodiment of the present invention.
Figure 5:
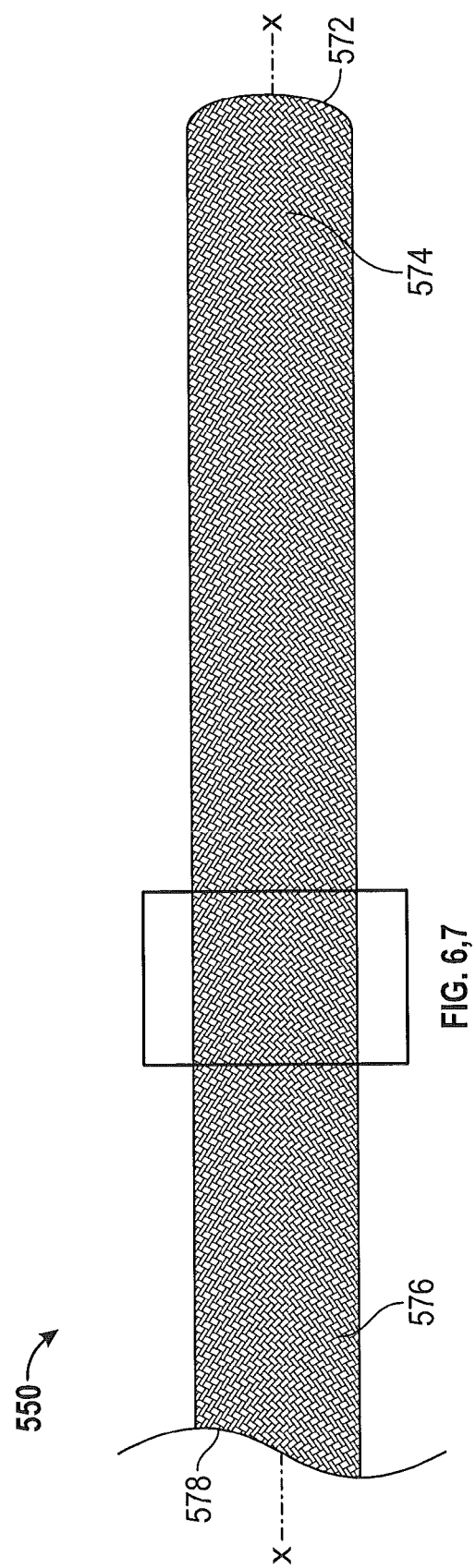
FIG. 5 is a top view of a portion of an arm segment according to an embodiment of the present invention.

Referring now to FIGS. 4 and 5, an exemplary arm segment 108 of arm 104 of the AACMM 100 is illustrated in more detail. Each arm segment 106, 108 includes a generally cylindrical hollow core 500 made from a suitably rigid material such as, but not limited to, a carbon-fiber composite material for example. A carbon-fiber composite material may be selected because of its low coefficient of thermal expansion (CTE) and its high stiffness. The core may alternatively be made from an extruded or woven synthetic material or metal. In one embodiment, the tubular core 500 of each arm segment 106, 108 is manufactured by wrapping at least one layer of an impregnated carbon-fiber composite material around a mandrel rotatable about a longitudinal axis X. In other embodiments, the core 500 may be made by other materials such as but not limited to extrude or woven synthetic materials or metals.

An outer material 550 is positioned adjacent the exterior surface 506 of the core 500 to enhance the aesthetic appeal of each arm segment 106, 108. The outer material 550 may include at least one layer of a composite material, such as an aluminum coated glass fiber epoxy prepreg for example. In one embodiment, the outer material 550 is Texalium® manufactured by Hexcel Corporation. In some embodiments, the absolute value of the coefficient of thermal expansion (CTE) of the material in the outer layer is much larger than the CTE of the composite material of the inner core 500. FIGS. 6 and 7 show the composition of the outer material 550 in detail. The outer material 550 includes a plurality of first fibers 560 oriented in a first direction and a plurality of second fibers 562 oriented in a second, different direction. In one embodiment, the first direction and the second direction are orthogonal to one another. The fibers 560, 562 of each layer of the outer material 550 may be arranged in any number of orientations, including but not limited to, a woven configuration, a braided configuration, or a unidirectional configuration for example. In one embodiment, one of the plurality of first fibers 560 and the plurality of second fibers 562 of the outer material 550 is oriented generally coaxially with the longitudinal axis X (see FIG. 6). In such embodiments, the other of the plurality of first fibers 560 and the plurality of second fibers 562 is oriented cylindrically, such that the fibers extend in a direction around the periphery of the tubular outer material 550 and the longitudinal axis X. In another embodiment, illustrated in FIG. 7, the plurality of first fibers 560 and the plurality of second fibers 562 may be arranged such that both the first fibers 560 and the second fibers 562 are oriented at a generally 45 degree angle to the longitudinal axis X.

The cross-section of exemplary arm segment 108, illustrated in FIG. 4, is formed by wrapping the outer material 550 around the carbon fiber core 500, for instance before the core 500 is removed from the mandrel. In a first embodiment, outer material 550 is bonded to the outer surface 506 of the core 500 by applying pressure from a vacuum and heat to the arm segment 108. The outer material 550 is wrapped around the core 500 such that the plurality of first fibers 560 and the plurality of second fibers 562 are in a desired orientation relative to each other and to the longitudinal axis X. By arranging the fibers 560, 562 in the outer material 550 orthogonally and by orienting them relative to the longitudinal axis X the torsional effects are minimized and restricted. As such, the outer material 550 is less likely to twist relative to the core 500 in response to a temperature change. The resulting torque placed on the encoders 214, 216, 234 of the arm 104 due to a change in environmental temperature is reduced or eliminated, thus improving the accuracy of the AACMM 100.

Figure 8:
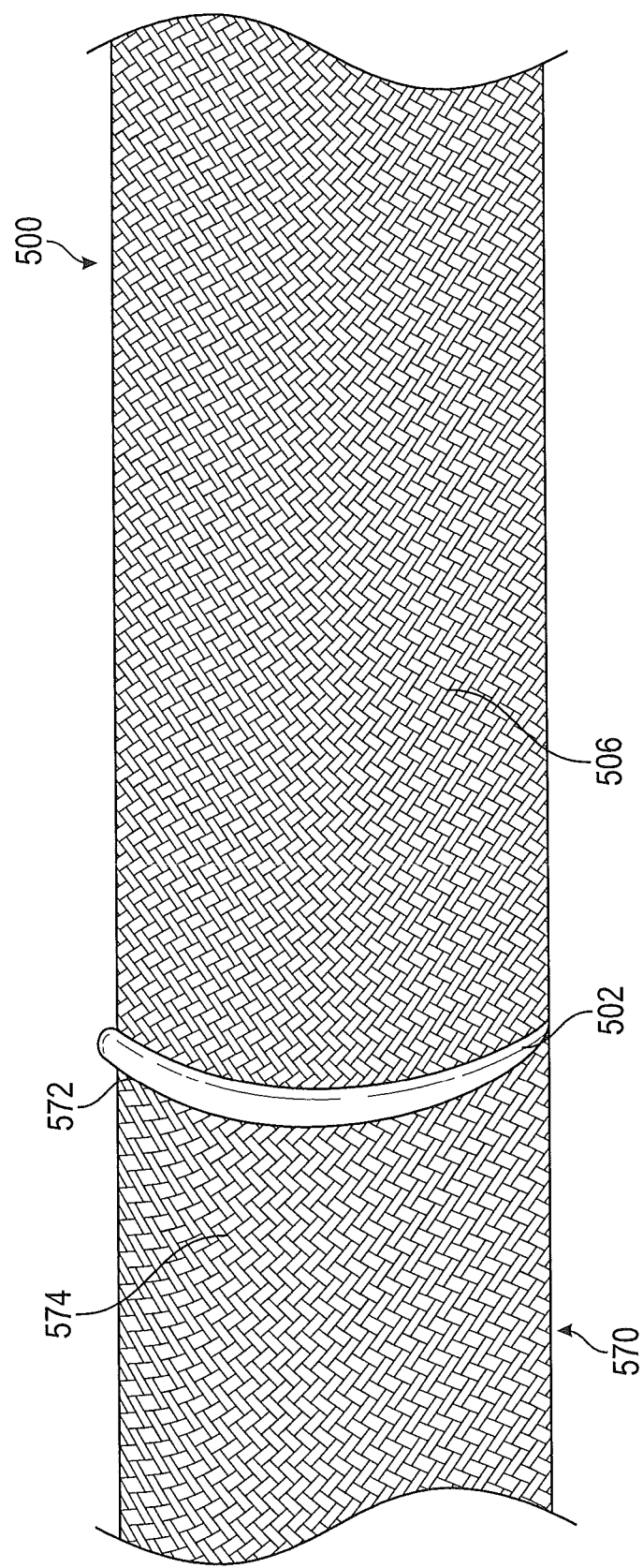
FIG. 8 is a perspective view of a portion of an arm segment according to an embodiment of the invention.
Figure 9:
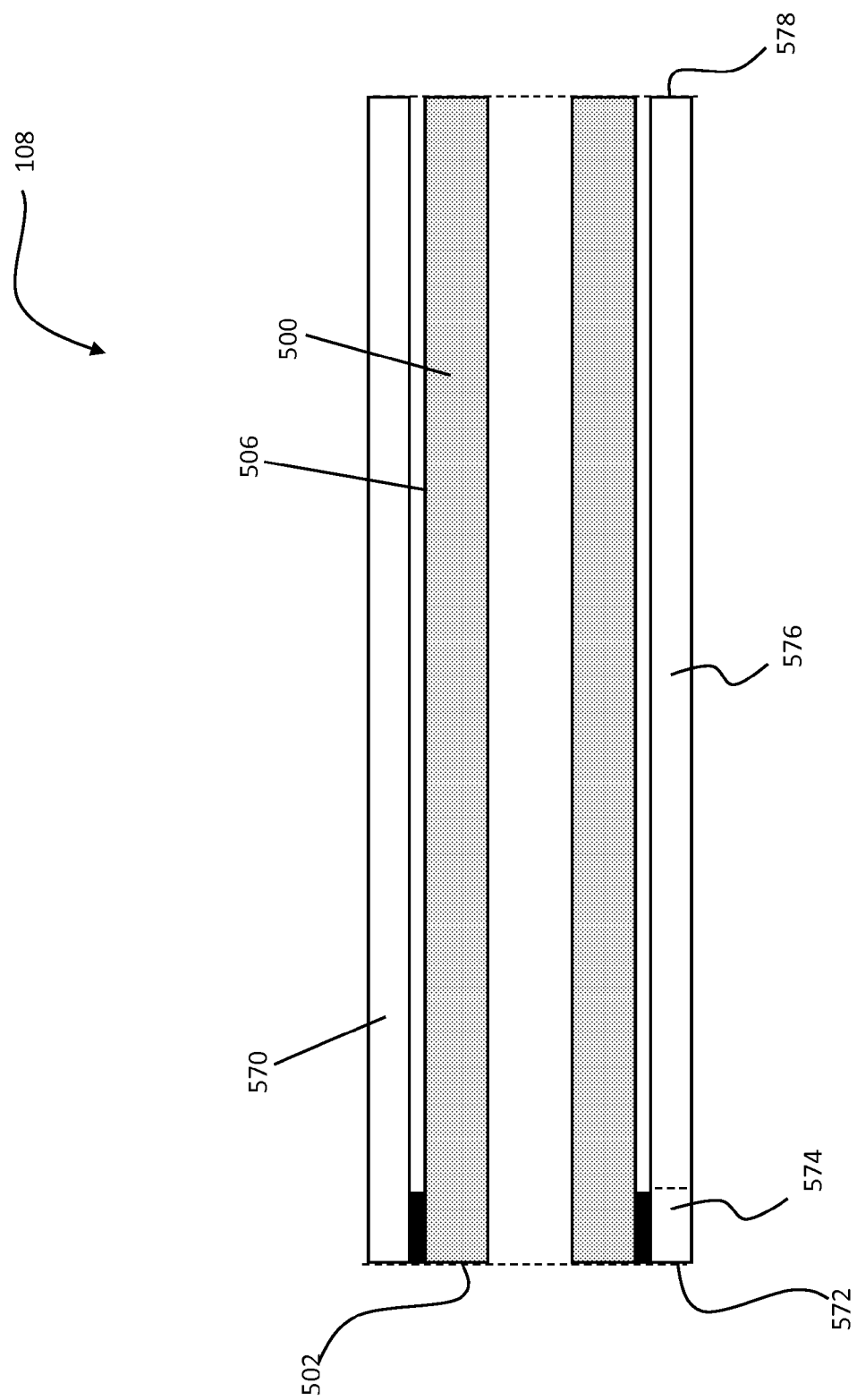
FIG. 9 is a cross-sectional view of an arm segment according to an embodiment of the present invention.

As shown in FIG. 8, the outer material 550 may alternatively be formed as a separate component 570, such as a tubular sleeve or shell for example, that slidably engages the core 500. The sleeve 570 may extend over a portion of, or alternatively, over the entire length of an inner core 500. In embodiments where the outer material 550 is a sleeve 570, the external surface 506 of the core 500 is smoothed, giving the core 500 a uniform outer diameter. The outer material sleeve 570 has an inner diameter larger than the outer diameter of the core 500 to create a loose fit. The outer material sleeve 570 may include a first portion 574 adjacent a first end 572 and a second portion 576 extending from the first portion 574 to adjacent a second, opposite end 578. In one embodiment, the first portion 574 of the sleeve 570 is coupled to a first end 502 of the core 500 (see FIG. 5) and the second portion 576 of the sleeve 570 is configured to move freely relative to the core 500 (see FIG. 9). By coupling only the first portion 574 of the sleeve 570 to the core 500, torsional forces from the sleeve 570 are imparted to the core 500 only at the location where the sleeve 570 and core 500 are coupled, rather than over the full length of the core 500. In one embodiment, the sleeve 570 is coupled to the end 502 of the core 500 opposite, not adjacent, a bearing cartridge 110, 112, 114. The first portion 574 of the sleeve 570 may be coupled to the first end 502 of the core 500 such as with a fastener, a weld, an adhesive, diffusion bonding, ultrasonic welding or any other known connection means. In one embodiment, the first portion 574 extends a predetermined length from the end 572 of the sleeve 570 wherein the first portion 574 is substantially smaller than the remaining portion of the sleeve 570. In the embodiment of FIG. 1, the sleeve 570 on arm segment 108 is coupled to the composite core of the arm segment 108 near the bearing cartridge pair 112. The sleeve on the arm segment 106 is coupled to the composite core of the arm segment 106 near the bearing cartridge pair 110. The short segment 107 has an outer sleeve that covers a metallic element such as aluminum or steel. It should be appreciated that the location of the coupling of the sleeve 570 to the core 500 may be reversed or a combination thereof.

Forming the outer material 550 as a sleeve 570 separate from the core 500 further isolates the core 500 of an arm segment 106, 108 from the twisting of the outer material 500 caused by a non-orthogonal fiber orientation. The sleeve 570 also isolates the core 500 from torque induced by a user while operating the AACMM 100, thereby further improving the accuracy of the machine. In addition, the sleeve 570 may be removably connected to the core 500 to allow for easy replacement if the outer material sleeve 570 is damaged. The color of the sleeve 570 may also be modified to correlate with a desired model of the AACMM 100.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

Furthermore, the use of the terms a, an, etc. do not denote a limitation of quantity, but rather denote the presence of at least one of the referenced item.

What is claimed is:

1. A portable articulated arm coordinate measurement machine (AACMM), comprising:
    a manually positionable articulated arm having opposed first and second ends, the arm including a plurality of connected arm segments, at least one of the arm segments having a longitudinal axis and including:
    a generally tubular composite core; and
    an outer sleeve surrounding at least a portion of the composite core, wherein the outer sleeve is a cylindrical tube including an integrally formed first portion and second portion, the first portion being arranged adjacent a first end of the outer sleeve and the second portion extending between the first portion and a second, opposite end of the outer sleeve, the first portion is being affixed to an end of the composite core and having a shorter length than the second portion and wherein the second portion is configured to move relative to the composite core;
    a measurement device attached to a first end of the AACMM; and
    an electronic circuit for providing data corresponding to a position of the measurement device.

2. The portable AACMM according to claim 1, wherein the composite core includes a carbon fiber composite.

3. The portable AACMM according to claim 2, wherein the composite core includes eleven layers.

4. The portable AACMM according to claim 1, wherein the first portion of the outer sleeve is coupled to the end of the composite core with an adhesive.

5. The portable AACMM according to claim 1, wherein the outer sleeve surrounds an entire length of the composite core.

6. The portable AACMM according to claim 1, wherein the outer sleeve is made from a composite including aluminum coated glass fiber epoxy prepreg.

7. The portable AACMM according to claim 6, wherein the outer sleeve includes two layers.

8. The portable AACMM according to claim 6, wherein the outer sleeve includes a plurality of first fibers arranged substantially orthogonal to a plurality of second fibers.

9. The portable AACMM according to claim 8, wherein the plurality of first fibers and the plurality of second fibers are oriented at about a 45 degree angle to the longitudinal axis.

10. The portable AACMM according to claim 8, wherein the plurality of first fibers is oriented substantially parallel to the longitudinal axis.

11. The portable AACMM according to claim 10, wherein the plurality of second fibers is oriented substantially cylindrically about the outer sleeve.

12. A portable articulated arm coordinate measurement machine (AACMM), comprising:
    a manually positionable articulated arm having opposed first and second ends, the arm including a plurality of connected arm segments, at least one of the arm segments having a longitudinal axis and including:
    a composite core;
    an outer sleeve configured to surround the composite core, an absolute coefficient of thermal expansion of the outer sleeve being larger than an absolute coefficient of thermal expansion of the core wherein the outer sleeve includes a plurality of first fibers arranged substantially orthogonal to a plurality of second fibers, wherein and the plurality of first fibers and the plurality of second fibers are arranged relative to a longitudinal axis of the arm segment;
    a measurement device attached to a first end of the AACMM; and
    an electronic circuit for providing data corresponding to a position of the measurement device.

13. The portable AACMM according to claim 12, wherein the plurality of first fibers and the plurality of second fibers are oriented at about a 45 degree angle to the longitudinal axis.

14. The portable AACMM according to claim 12, wherein the plurality of first fibers is oriented substantially parallel to the longitudinal axis.

15. The portable AACMM according to claim 14, wherein the plurality of second fibers is oriented substantially cylindrically about the longitudinal axis.

16. The portable AACMM according to claim 12, wherein the outer sleeve is a composite including aluminum coated glass fiber epoxy prepreg.

17. The portable AACMM according to claim 16, wherein the outer sleeve includes two layers of fibers.

18. The portable AACMM according to claim 12, wherein the outer sleeve includes a first portion and a second portion and the first portion is coupled to an end of the composite core.

19. The portable AACMM according to claim 18, wherein the outer sleeve is coupled to the end of the composite core using an adhesive.

20. The portable AACMM according to claim 12, wherein the composite core includes a carbon fiber composite.

21. The portable AACMM according to claim 12, wherein the composite core includes a plurality of third fibers oriented substantially orthogonal to a plurality of fourth fibers.

22. A method of forming an arm segment for a portable AACMM, comprising:
    forming a generally hollow cylindrical core having a longitudinal axis from a first material;
    forming a tubular sleeve from a second material having a plurality of first fibers arranged orthogonally to a plurality of second fibers such that the plurality of first fibers and the plurality of second fibers are in a desired orientation relative to the axis, the sleeve including an integrally formed first portion and second portion;
    inserting the core into the sleeve; and
    affixing a first portion of the sleeve to a first end of the core such that the second portion of the sleeve is movable relative to the core.

23. The method according to claim 22, wherein the first portion of the sleeve is affixed to the first end of the core using an adhesive.

24. The method according to claim 22, wherein the plurality of first fibers is oriented substantially parallel to the axis and the plurality of second fibers is oriented substantially cylindrical about the axis.

25. The method according to claim 22, wherein the plurality of first fibers and the plurality of second fibers are oriented at about a 45 degree angle to the axis.

26. The method according to claim 22, wherein the core includes a carbon fiber composite.

* * * * *